United States Patent [19]
Walls et al.

[11] Patent Number: 5,848,410
[45] Date of Patent: Dec. 8, 1998

[54] SYSTEM AND METHOD FOR SELECTIVE AND CONTINUOUS INDEX GENERATION

[75] Inventors: Jeffrey J. Walls; David J. Sweetser, both of Fort Collins, Colo.

[73] Assignee: Hewlett Packard Company, Palo Alto, Calif.

[21] Appl. No.: 947,005

[22] Filed: Oct. 8, 1997

[51] Int. Cl.$^6$ .................................................. G06F 17/30

[52] U.S. Cl. ......................... 707/4; 707/3; 707/5; 707/6; 707/7; 707/102; 707/104; 707/206; 707/501

[58] Field of Search ................................... 707/5, 6, 3, 4, 707/7, 206, 102, 104, 501

[56] References Cited

U.S. PATENT DOCUMENTS

| | | | |
|---|---|---|---|
| 3,670,310 | 6/1972 | Bharwani et al. | 707/501 |
| 4,845,658 | 7/1989 | Gifford | 707/2 |
| 5,685,003 | 11/1997 | Peltonen et al. | 707/3 |

OTHER PUBLICATIONS

Cricket Liu et al., Managing Internet Information Services 133–136; 321–323 (1994).

*Primary Examiner*—Paul R. Lintz
*Assistant Examiner*—Thu-Thao Havan

[57] ABSTRACT

To improve access to documents in a large database, such as the World Wide Web of the Internet or a group intranet, a continuously updated computer organization and display system, and a method for such an organization and display system, is provided to quickly locate desired documents without generating references to undesired documents, and to quickly allow a user to determine if any documents of interest are available. In one embodiment, such organization and display system includes data structures for storing and processing information extracted from the header lines of web pages in file systems chosen by a user. Linked lists are created in such data structures to allow rapid construction and display of an alphabetical index of keywords from such header lines, each keyword having associated with it a title extracted from the same web-page header. The alphabetical index by keywords may be displayed on a file that permits the user readily to jump to a desired location in the alphabetical index. Alternatively, the user may search the alphabetical index to find titles or keywords that correspond with an entered character string. A user may select a title in the index and view the file from which the title was extracted.

38 Claims, 12 Drawing Sheets

SYSTEM AND METHOD FOR SELECTIVE AND CONTINUOUS INDEX GENERATION

FIELD OF THE INVENTION

The invention generally relates to data processing, search, and display systems that facilitate access to files in large databases and, more particularly, to index files in publicly- and privately-accessible networks.

BACKGROUND OF THE INVENTION

The interconnection of computers in increasingly large networks provides users with access to enormous amounts of information. This information may be said to be highly distributed in that it generally is stored on, or accessible by, numerous network servers. Each network server typically provides network support and coordination for a network of personal computers, work stations, or other types of computers. A network server may maintain or have access to one or more groups of files consisting of documents, programs, scripts, or data in other forms. Such a group of files may be referred to as a file system, which generally are organized by a hierarchical system of directories and subdirectories. The files of a file system may be stored in magnetic, optical, or other medium directly or indirectly accessible by the network server.

One such publicly accessible interconnection of computers is commonly referred to as the Internet, which includes a large number of smaller networks of network servers. Network servers in the Internet typically support the Hyper-text Transfer Protocol (HTTP) that allows the transfer and display of data files formatted in the Hyper-Text Markup Language (HTML). The interconnection of such network servers is commonly referred to as the World Wide Web, and the data files transferred over the World Wide Web are commonly referred to as web pages.

A web page contains data that may be displayed or reproduced by a software application commonly referred to as a web browser. Such data may appear in a variety of forms, including text, graphics, images, sound, and video. In addition, a web page commonly includes pointers, or hyperlinks, to other web pages or to directories. As displayed on the web page, such a hyperlink is typically identified by a textual or graphical element such as a character string or icon, often highlighted by color, underlining, or a change in the shape of a proximately located cursor. Each hyperlink has associated with it an address, known as a Uniform Resource Locator (URL), in HTML format, that uniquely identifies the referenced file server (or web server), directory, web page, or a location on a web page (hereafter, simply "web page"). Access to the referenced web page is typically initiated by manipulating a pointing device, such as a mouse, trackball, touchpad, joystick, or keyboard cursor keys, so that the cursor on a video display is positioned at or adjacent to the hyperlink. The user may then press a button or key to select the hyperlink and thereby indirectly indicate the URL of the referenced web page that the user wishes to retrieve.

The HTML format commonly used by publicly accessible network servers enables a reader of a web page readily to pursue interests related to the content of that web page through the selection of hyperlinks. Consequently, a user interested in a particular subject may start with one web page that links to a number of other related web pages, which may link to additional related web pages, and so on. Navigating through such a group of interrelated web pages, however, is often time consuming. This technique may also be highly inefficient since the hyperlink representation may not accurately represent the content of the web page to which it points. In addition, a number of hyperlinks that appear dissimilar due to different hyperlink representations may point to the same web page, causing the user to access previously accessed web pages.

Alternatively, a user interested in a particular subject may employ one of a variety of software applications referred to as search engines. Typically, the user provides the search engine with a string of characters, often referred to as keywords. The search engine then attempts to match the keywords with web pages that have the same or related character strings in their titles or text. Because the World Wide Web is so large, however, the number of matching web pages returned to the user by the search engine may number in the tens or hundreds of thousands, or more. Moreover, even with use of boolean expressions, artificial intelligence, and other schemes for narrowing and specifying the search, the web pages identified by the search engine may be tangential or unrelated to the interests of the user, having been generated by a homonym or a coincidence of word usage. Significantly, prior search methods and systems commonly require a repetitive process by which the user requests information, the information is retrieved and presented to the user, the user refines the search request to eliminate unexpected results from the initial search or to narrow an unexpectedly broad search result, information is again retrieved and presented, and so on. Because access to information over the Internet is not instantaneous and sometimes may be slow, such prior methods and systems can consume large amounts of time without any guarantee that the user will eventually either find the information desired or be able reasonably to conclude that the information is not available.

When the user has succeeded in finding a web page of interest either by following hyperlinks, searching by keywords, or entering the URL directly, the user may wish to be able to return to such web page at a future time. One known method for facilitating such a return is to record the URL of such a web page by associating with it a so-called "bookmark." The user may create a hierarchy of bookmarks arranged within folders, sub-folders, sub-sub-folders, and so on. These folders may be arranged alphabetically, by subject matter, according to importance or frequency of access, or another scheme. The user may then search through this collection of bookmarks to find one of interest, and select such bookmark to return to the associated web page. The burden of developing such a collection of bookmarks lies with the user, requiring significant time and effort in finding web pages of interest, deciding on descriptive names for folders and sub-folders, organizing the folders alphabetically or otherwise, amending the names of folders or their organization as the interests of the user change or expand, and updating the contents of the folders as referenced web pages change their URL's or become inaccessible.

In addition, such prior systems and methods for finding and organizing desired information often fail adequately to provide a user with control over the sources from which such information is obtained. A user may, for example, be able to limit a search to a certain topic by using appropriate keywords or by selecting from an appropriate category, but not be able to limit the search to a particular file system of group of file systems. Thus, references to highly valuable information maintained in a particularly relevant file system may be overlooked because the references are hidden among a large number of references derived from less relevant or even spurious sources of information. Also, it is usually desirable to ensure that information gleaned from various searches and organized, for example, under a bookmark scheme, remains current. To satisfy this goal, the user may typically be required to initiate and conduct another search, or to reexamine the information referenced by the bookmark scheme. Such efforts typically require significant time and the personal attention of the user. Moreover, the results may be highly dependent on the particular keywords or combination of keywords used in a search, the type of search engine, the subjective preferences of the user in organizing a bookmark scheme, and other factors.

Similar problems of identifying, organizing, or accessing web pages of interest are presented to users of "intranets," which generally are networks of computers within a company, institution, agency, or other entity, and which, unlike the Internet, are not ordinarily or generally accessible to the public. The number of web pages accessible by such an intranet may also be very large and diverse in subject matter both because there may be a large number of web pages generated within the intranet group, and because users of the intranet may wish to incorporate externally generated web pages, for example, from the Internet or another intranet. An intranet may be vital to the efficient operation of a group of users, such as a department or project of employees, as it grows to include within its web pages correspondence, documents, reports, forms, instructions, lists, records, and other work product, reference materials, or information. In such a group setting, it is often inefficient and may be counterproductive for each individual to develop her or his own scheme for identifying, organizing, or accessing such web pages on the intranet, as is required by prior methods such as bookmark organization.

Accordingly, what is needed is a system and method that provide standardized, replicable, non-duplicative, relevant, and efficient access to desired information stored in files of a database. The user should be able to identify, and thereby limit, the file systems that are to form the source of information from which the desired information is to be retrieved. In addition, such system and method should be well adapted to use by a group, specifically by avoiding duplication of effort among group members, allowing group members to learn to use the system or method with minimal effort, and providing an intuitive user interface that displays information in substantially the same format for all users.

SUMMARY OF THE INVENTION

The present invention is a system and method for comprehensively and continuously indexing information stored in one or more sources of information such as a database. In one aspect of the invention, a continuous indexer is disclosed. The continuous indexer is configured to search one or more files within at least one file system at one or more intervals to provide a user with a continuously updated index of information contained within the file system. The index includes index-organizing elements that characterize subjects of the information and corresponding location elements that identify which of the files contains the subject characterized by the corresponding index-organizing element. Significantly, this capability provides current information to the user, thereby eliminating the need periodically to repeat a search to ensure that changes in information of the one or more files are considered by the user.

Preferably, the continuous indexer searches all of the one or more files within the at least one file system, providing the user with a comprehensive index of the information within the at least one file system. This capability eliminates the need for the user to initiate additional searches to determine whether all relevant information has been retrieved.

In one embodiment, the index also includes descriptive elements, each corresponding with one of the index-organizing and corresponding location elements. The descriptive elements describe the subject of the information characterized by the corresponding index-organizing elements. In one embodiment, the index further includes one or more secondary index-organizing elements, each of which corresponds with one of the index-organizing elements. The secondary index-organizing elements characterize the information in greater specificity than characterized by the corresponding index-organizing element.

In one embodiment, the at least one file system is user-selected. Advantageously, this capability enables the continuous indexer to search only those information sources designated by the user as being likely to contain the information of interest, thereby reducing the number of irrelevant sources.

In one embodiment, the at least one file system includes files in a network. In one implementation, the at least one file system includes files in a distributed database.

Advantageously, in one implementation, the one or more files of the at least one file system are in HTML format.

In one embodiment, the one or more files is user-selected. Advantageously, this capability enables the continuous indexer to search only those information sources designated by the user as being likely to contain the information of interest, thereby reducing the number of irrelevant sources.

In one embodiment, the continuous indexer searches a predetermined portion of the one or more files. In one implementation, such predetermined portion is the header. Advantageously, this capability of searching only the header of the file rather than the entire file reduces the amount of time needed to create the index.

In one embodiment, the descriptive elements of the index are the titles of the files in the file system. In one embodiment, the files include a header, which includes an index-organizing element that is a keyword.

In one embodiment, the continuous indexer searches the files of the file system at one or more user-selected intervals. Advantageously, this capability allows the user to determine how frequently the index should be re-created so that the information in the index is current when needed by the user. In one implementation, such intervals may be predetermined. This capability permits the user to use the index without waiting for it to be re-created because the index is automatically re-created at periodic intervals, such as every hour or at the beginning of every work day.

In one embodiment, the continuous indexer includes a file-system identifier configured to identify the file system from which the index is created, and to analyze the files of the file system to determine how the index-organizing and descriptive elements are to be extracted from the files. In one embodiment, the continuous indexer includes an index builder configured to extract from the files the index-organizing elements and descriptive elements, and to organize those elements and the location element in a predetermined format. Advantageously, in one implementation, such predetermined format is alphabetical. This organizational scheme allows the user intuitively and quickly to determine whether a subject matter of interest to the user is contained in the index by looking at the alphabetically organized index-organizing elements or descriptive elements.

In one implementation, the index builder includes a file scanner to access the files; a data structure generator to generate at least one data structure and to store the index-organizing element, the descriptive element, and the location element in such data structure; and an index generator to generate the index from the stored elements. In one implementation, the index generator formats the stored elements in an HTML format to generate the index. Advantageously, this capability allows the index to be displayed to the user as a web page of an intranet or over the Internet. In one implementation, the file scanner periodically re-initiates processing of the files in the file system at a user-selected refresh rate. Advantageously, in one implementation, the file scanner initiates such periodic processing automatically without a user command.

In one embodiment, the file scanner copies the header information from a remote file in the file system to a local file in the file system. Advantageously, this capability reduces the time needed to create the index in subsequent periodic processing because the header information may be obtained locally without time delays that may be associated with accessing remote files.

In one preferred embodiment, the data structures created by the index builder include a storage data structure to store the index-organizing element, the descriptive element, and the location element; and a pointer data structure linked to the storage data structure. The linkage links a first pair of the stored descriptive element and corresponding stored location element to a second pair of stored descriptive element and corresponding stored location element, in which the corresponding index-organizing element of the first pair is linguistically similar to the corresponding index-organizing element of the second pair. In one preferred implementation, such linguistic similarity is that the index-organizing element of the first pair is the same as the corresponding index-organizing element of the second pair. Advantageously, this linkage allows the index builder to create the index by accessing a first pair of index-organizing and location elements and follow the linkage to other such pairs having linguistically similar, or the same, index-organizing elements. The index builder advantageously may then repeat such process for the next group of such pairs having a different index-organizing element, thus creating groups of such pairs organized by common index-organizing elements.

In one embodiment, the data structures created by the index builder also includes a search data structure in which to store the index-organizing element and the location element, and wherein the stored search elements are configured to be compared to at least one user-specified character. In one preferred implementation, the index generator of the index builder formats the stored search elements in an HTML format to generate a search report in response to the user-specified search character. Advantageously, this capability allows the user to specify a search character or string of such characters, such as a search word, and be presented with a search report in HTML format that indicates which of the files in the file system have an index-organizing element that contains the search characters. Also advantageously, the presentation of such search report to the user in HTML format, including the non-displayed location element, allows the user to select an entry in the report of interest and retrieve the corresponding file in accordance with known techniques for selecting and retrieving hyperlinked files from a web page.

In one embodiment, the file scanner includes a scan initiator to initiate the processing of the files in the file system; a file handler to access the files in response to the scan initiator; and a header parser to extract the index-organizing element from the files. In one preferred implementation, the header parser terminates access to a file if the formatting scheme of the file is not the same formatting scheme as at least one formatting scheme in a predetermined database of formatting schemes. In another preferred implementation, the header parser terminates access to the file if a post-header HTML tag is found before the index-organizing element is found. In yet another preferred implementation, the header parser terminates access to the file if more than a predetermined number of bytes of data are encountered before the index-organizing element is found. Advantageously, these preferred implementations allow a first file to be closed, and a next one in the file system read, as soon as it is determined that such first file does not contain a header or an index-organizing element in HTML format. Thus, time is not wasted reading the entire first file.

In one embodiment, the continuous indexer also includes a display manager to display specific portions of the index in response to user-generated commands. In a preferred implementation, such specific portions of the index include at least one descriptive element displayed in association with a corresponding index-organizing element. In a most preferred embodiment, the displayed specific portions of the index include index-organizing elements, at least one secondary index-organizing element displayed in association with a corresponding index-organizing element, and at least one descriptive element displayed in association with a corresponding secondary index-organizing element. Advantageously, this capability allows a user quickly to locate a subject of interest by looking in the index for an index-organizing element related to such subject, and further refining the search by looking for a secondary index-organizing element that may more specifically characterize the subject of the file associated with such elements and the corresponding location element.

In another aspect of the invention, a method is disclosed for displaying a portion of an index on a graphical user interface. The index includes index-organizing elements, each having an initial character and a set of first two initial characters; and corresponding location elements. The method includes the steps of displaying a character bar consisting of such initial characters; moving a cursor on the graphical user interface to a position proximate to a desired initial character; selecting the desired initial character; and displaying the portion of the index in which the index-organizing elements have the initial characters. In a preferred implementation, such method also includes the steps of displaying a character bar including a plurality of the set of first two initial characters, each having the selected desired initial character; moving a cursor on the graphical user interface to a position proximate to a desired set of such first two initial characters; selecting the desired set of first two initial characters; and displaying the portion of the index in which the index-organizing elements have the desired set of first two initial characters.

In another aspect of the invention, a method is disclosed for retrieving a file from a file system having one or more files containing information. The method includes the step of displaying an index on a graphical user interface, in which the index includes index-organizing elements characterizing subjects of the information, corresponding location elements identifying which of the one or more files contains the subject represented by the corresponding index-organizing element, and descriptive elements corresponding with one of the index-organizing and location elements and describing the subject of the information characterized by the index-organizing element. Such method also includes the steps of moving a cursor on the graphical user interface to a position proximate to a first descriptive element describing information of interest; selecting the first descriptive element; and retrieving the file identified by the location element. In a preferred implementation, such method also includes the step of displaying the information in the file associated with the selected descriptive element.

In another embodiment, a method is disclosed for displaying a continuously updated index of information contained within at least one file system having one or more files, each of the files having an index-organizing element, descriptive element, and a location element. Such method includes the steps of identifying the file system; extracting from the files the associated index-organizing, descriptive, and location elements; organizing the index-organizing elements; associating each of the location elements with its associated index-organizing element; and displaying each of the descriptive elements with its associated index-organizing elements.

BRIEF DESCRIPTION OF THE DRAWINGS

The above and further advantages of the invention will be more clearly appreciated from the following detailed description when taken in conjunction with the accompanying drawings, in which like reference numerals indicate like structures or method steps, in which the leftmost numbers of a reference numeral indicate the number of the figure in which the referenced element first appears, and in which.

DETAILED DESCRIPTION

Figure 1:
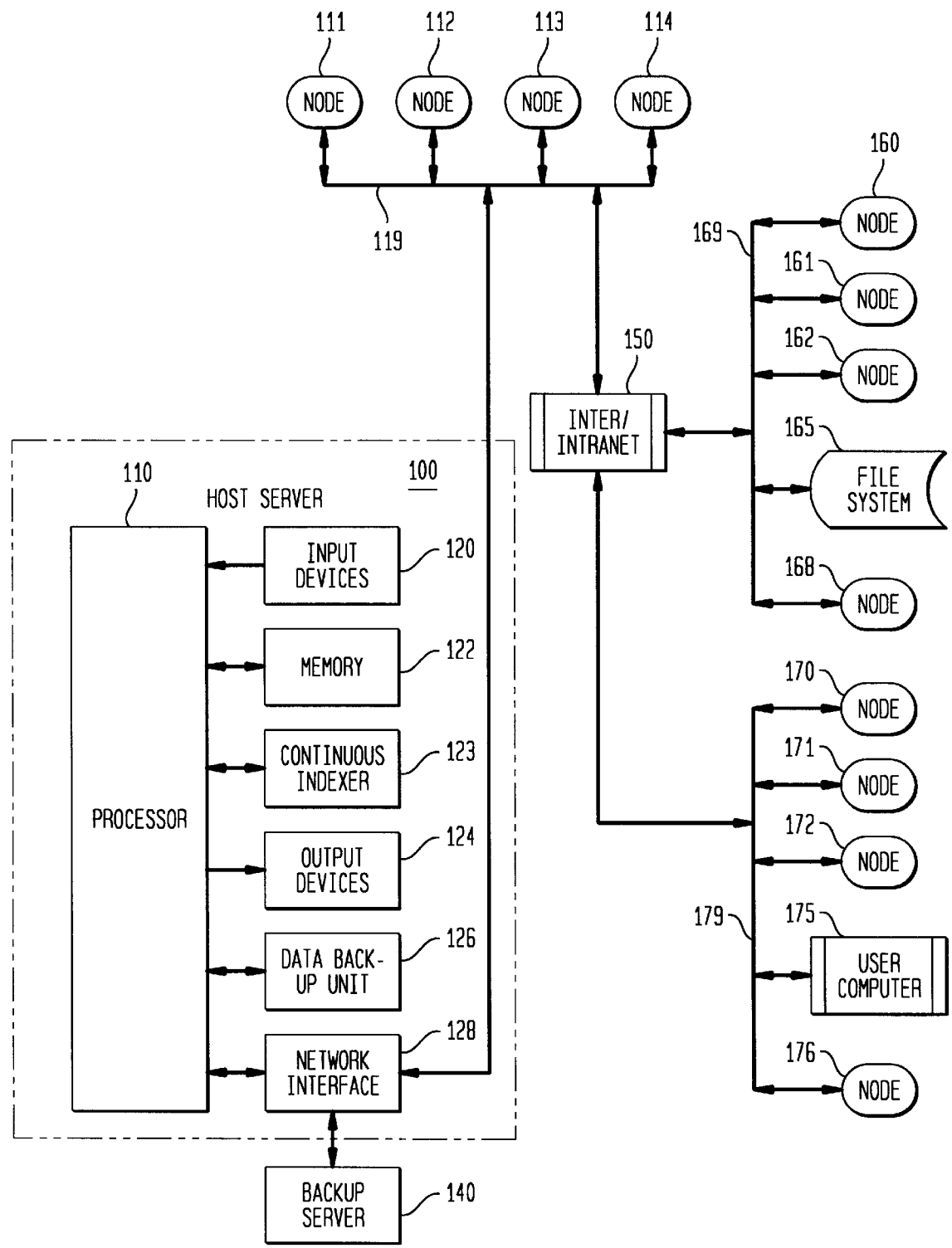
FIG. 1 is a block diagram of a network environment suitable for implementing the present invention.

The present invention is a system and method for selectively and continuously indexing information stored in one or more sources of information such as files of a database. The present invention, referred to herein as a continuous indexer, searches predetermined portions of user-selected sources of information in the database at selected or predetermined intervals to provide the user with a continuously updated index of the subject matter included in the user-selected sources of information. Advantageously, the continuous indexer searches only those information sources designated by the user as being likely to contain the information of interest, thereby reducing the number of irrelevant sources. Furthermore, continually updating the index eliminates the need for the user periodically to repeat a search to ensure that any changes in the information sources have been included in the search results. A further advantage of the continuous indexer is that it searches all selected sources of information and provides the user with a comprehensive index of the subject matter of all the information within the designated sources. This capability eliminates the need for the user to initiate additional searches to determine whether all relevant information has been retrieved. The invention may be implemented in software suitable for operation on personal computers, network servers, workstations, or other computer platforms now or later developed. Alternatively, the invention may be implemented in hardware, firmware or any combination thereof.

The index created by the continuous indexer includes a collection of index entries (or simple "entry"), each entry referring to a document, file, web page, or other unit of information. In accordance with one preferred embodiment of the continuous indexer, an entry includes three elements: an index-organizing element, a descriptive element, and a location element. The index-organizing element includes a keyword that characterizes the content of the unit of information. The keyword may be, for example, a word or simple phrase. The descriptive element may be a title or similar short description of the content of the unit of information. The location element indicates the location of the information unit within one of the information sources selected by the user for indexing. Thus, a user may consult the index-organizing elements to find a topic of interest, identify a specific unit of information as being of immediate interest based on its descriptive element, and retrieve the unit of information based on the corresponding location element.

In one preferred application, the database is distributed across nodes of an HTML-based intranet. In this embodiment, the sources of information are user-selected file systems in the intranet, and the units of information to be indexed are the files, commonly referred to as web pages, in such file systems. The index-organizing element associated with each file in this embodiment is the keyword, or possibly keywords, that the author of the file has included in the header of the file. The descriptive element of this embodiment is the title of the file, which is also included in the header of the file. In one embodiment, the location element is the URL of the file. In an alternative embodiment, the location element may not be included or may be defaulted to one URL for all files when the location of the files may be inferred. For example, in intranets having one file system, all files must be located in that files system. The term "header information" is thus used hereafter to refer to the title, keywords, and URL of files in this embodiment and, more generally, to the descriptive element, index-organizing element, and location element of files in other embodiments.

The index of this embodiment may advantageously be arranged alphabetically according to the keywords. Thus, having once selected the file system or systems (hereafter, simply "selected file system") to be indexed, the user may thereafter readily find files of interest by consulting the alphabetical index of keywords and selecting specific files based on their titles. The titles typically will be arranged alphabetically in groups associated with their common keyword. The index is comprehensive because every file in the selected file system is included, provided that the file has a header containing at least one keyword and a title. According to such an arrangement, the user may immediately see the titles of all files in the selected file system related to a particular keyword. Rather than conducting a search according to known systems or methods that may or may not identify files of interest, and that do not conclusively establish whether other relevant information might be found by another search, this embodiment of the present invention provides the user with an immediate indication of whether desired information is available in the selected file system and, if so, where it is. Advantageously, such result is accomplished without significant effort by the user. Also unlike known systems and methods, the present invention allows users in a group to learn and use a common approach to selecting and retrieving information. Such attributes are significant in group settings, in which sharing of information, ease of learning and maintenance, and quality assurance are valued.

The attributes of the present invention and its underlying method and architecture will now be described in greater detail in reference to one embodiment of the invention represented in FIGS. 1 and 2 as continuous indexer 123. FIG. 1 is a block diagram of a network environment suitable for implementing the invention. Host server 100 includes known components including processor 110, input devices 120, memory unit 122, output devices 124, data backup unit 126, and network interface 128. Continuous indexer 123 is implemented in the present embodiment in the PERL and "C" programming languages for instructing processor 110 to effectuate the data processing and other operations of continuous indexer 123 as described below. It will be understood by those skilled in the relevant art that many other programming languages could be used for this purpose. Alternatively, continuous indexer 123 may be implemented in any combination of software, hardware, or firmware. If implemented in software, continuous indexer 123 may typically be loaded into memory unit 122 through an input device 120 or in accordance with one of a variety of other known methods. Processor 110 may be a commercially available processor such as the Pentium microprocessor from Intel Corporation, PowerPC microprocessor, PA-RISC processor, SPARC processor, or 68000 series microprocessor, or it may be one of many other processors that are or will become available. Such a processor typically executes an operating system (not shown), which may be, for example, the DOS, Windows 3.1, Windows for Work Groups, Windows 95, or Windows NT operating system from the Microsoft Corporation, the System 7 operating system from Apple Computer, the Solaris operating system from Sun Microsystems, the Unix operating system available from many vendors such as Sun Microsystems, Inc., Hewlett-Packard, or AT&T, the "freeware" version of Unix known as Linux, or the NetWare operating system available from Novell, Inc., or some combination thereof, or a future operating system. Such operating system interfaces with firmware and hardware in a well-known manner, and facilitates processor 110 in coordinating and executing the functions of the other components of host server 100 as described above, including continuous indexer 123.

It will be understood that host server 100 is typically, but need not be, a network server that may be implemented on a personal computer, workstation, other computer platform, or a device specially designed and configured to perform the functions of host server 100 as described below. It will also be understood that there are many possible configurations of the components of the host server 100. For example, input devices 120 could include any of a variety of known devices for accepting user input, such as a touch-screen display, a touch pad, or a microphone with a voice recognition device. Similarly, output devices 124 could include a video monitor, a printer, or an audio speaker with a voice synthesis device. Memory 122 could include any commonly available random access memory (RAM) or read-only memory (ROM), other magnetic medium such as a resident hard disk, or other memory storage device. Memory 122 may also include removable storage devices such as a CD-ROM drive, a tape drive, a removable hard disk drive, or a diskette drive. Network interface 128 may include a modem or other communication device. It will be understood that some components of the illustrated embodiment of host server 100, such as data backup unit 126, may not be present in alternative embodiments, and that the simple representation of FIG. 1 may not include or explicitly show other components, such as video display cards or cache memory, that are commonly found in network servers. Similarly, backup server 140 is not essential, but may be used to take over the functions of host server 100 in the event of a disruption of host server 100 so that there is no interruption of service to users of continuous indexer 123.

In the illustrative implementation, host server 100 is connected via its network interface 128 to network 119. The nodes of network 119, such as nodes 111, 112, 113, and 114, may each consist of or include a host server such as host server 100, each of which may serve a file system. Network 119 may be connected through Internet or intranet 150 to other networks, such as network 169 or network 179. File system 165 is connected to network 169. Additional file systems may be connected to network 169 through host servers at, for example, nodes 160, 161, 162, or 168. The terms "connection" and "connected to" in this regard refer to being communicably coupled in accordance with known procedures and protocols applicable to Internet or intranet 150. In other embodiments of the invention, file system 165 need not be connected to host server 100 via the Internet or an intranet, but may be connected directly such as through network 169.

File systems that are connected to host server 100 and not typically located in physical proximity to host server 100, or not part of the intranet of the group using host server 100, will hereafter be referred to as a remote file system. Files contained within remote file systems are referred to as link or remote files. Alternatively, file systems accessed over a group's intranet or a local area network are referred to herein as local file systems, having source or local files stored therein. A local file system and local files may also be contained in a memory unit, such as memory 122, that is part of host server 100.

A user of continuous indexer 123 may employ a personal computer, such as user computer 175 attached to network 179, or a network server, work station, larger computer, or other device designed for, or capable of use with, the Internet or an intranet 150. Such a user computer will typically include a processor, an input device, a display unit, one or more memory units, and a network interface, not shown. In another embodiment, user computer 175 may be connected directly to host server 100 through its network interface 128 and a network such as network 119. It will be understood that networks 119, 169, and 179 may include various components such as switches and amplifiers, and that the communication may be carried by electric cable, microwave, fiber optic cable, radio waves, or other material or medium. It is also understood that many user computers, connected to network 179 at, for example, nodes 170, 171, 172, or 176, may be connected to host server 100 via the Internet or an intranet 150. Also, although file system 165 is shown in FIG. 1 as being located at a node other than that of host server 100, it need not be so other embodiments. In particular, file system 165 could be located in memory 122 of host server 100, or otherwise directly accessible by host server 100. Also, in another embodiment, user 210 may interact with host server 100 directly through input devices 120 and output devices 124 of host server 100.

Figure 2:
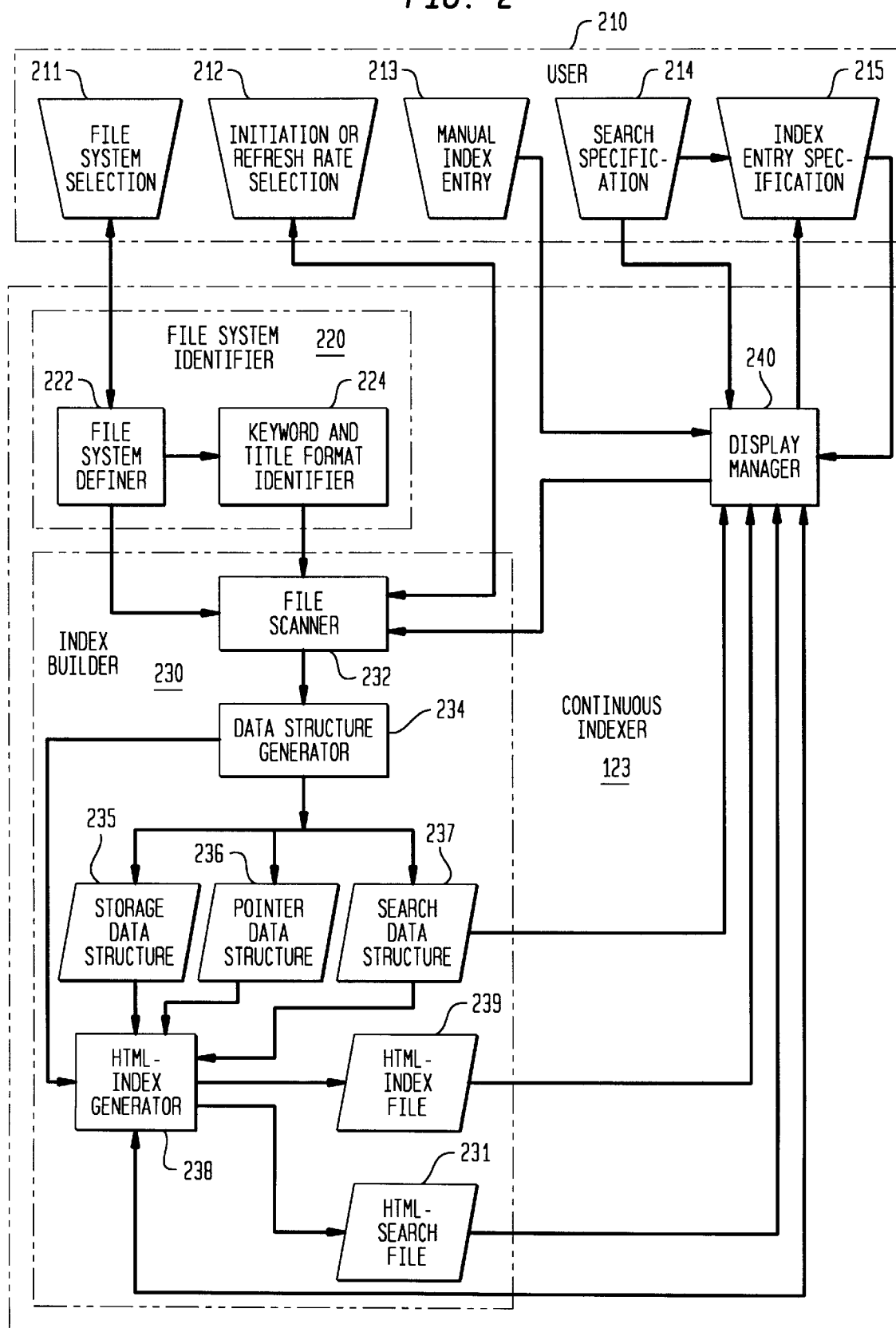
FIG. 2 is a functional block diagram of the file system identifier, index builder, and display manager of one embodiment of the present invention being used by a user.

FIG. 2 is a functional block diagram of continuous indexer 123 as it may be used by a user 210, who will typically be a person but may also be a machine. Continuous indexer 123 includes a file-system identifier 220; display manager 240; and index builder 230. File-system identifier 220 identifies the file system from which an index will be built and analyzes the files of the selected file system to determine how keyword and title information may be extracted from such files. Index builder 230 extracts from each file the index-organizing element, descriptive element, and location element that are used to create a corresponding entry in an index represented by HTML-index file 239. Index builder 230 also efficiently organizes these three elements so that HTML-index file 239 may readily be provided to display manager 240. Display manager 240 displays to the user specific portions of HTML-index file 239 in response to requests from the user. The functions of file-system identifier 220, index builder 230, and display manager 240 will now be described in turn.

File System Identifier 220. File system identifier 220 includes file-system definer 222 that uses known techniques to prompt user 210 to select a file system and receive from user 210 a file system selection 211. Any one of a variety of known graphical or other interfaces may be employed to effectuate such prompt and to receive the response. For example, a graphical representation of a directory or tree of file systems may be presented to user 210, who may then use a cursor pointing device to select a file system. Alternatively, user 210 may be prompted to enter through a keyboard a path to the desired file system. If user 210 does not select a file system when so prompted, file-system definer 222 provides a default file system, which may be the file system most recently or most frequently selected by user 210, the file system of an intranet used by a group of which user 210 is a member, or another default file system. For purposes of illustration, it will be assumed hereafter that user 210 has selected file system 165. It will be understood that file system 165 may be a remote file system, such as may be accessed over the Internet, or it may be a local file system such as may be accessed over an intranet of a group or other entity of which user 210 is a member.

File-system definer 222 analyzes file system 165 to determine the particular type of format or formats in which files in such file system are written. Such analysis may typically be accomplished by accessing a first file in file system 165 using known methods for addressing and retrieving remote or local files in accordance with the Hyptertext Transfer Protocol. The file is then examined to determine if special characters, tags, or other format indicators are present that would indicate the type of formatting used. For example, the characters "<HTML>" encountered in the file would indicate that it is written in the HTML format. As will be evident to those skilled in the art, any of a variety of comparison, look-up, or other methods may be used to associate the format indicators present in such first file with format indicators characteristic of one of a number of known format schemes. Optionally, using any of a variety of known sampling methods, one or more additional files may similarly be examined to determine if other formatting schemes are used for files in file system 165. In one preferred embodiment, this determination is achieved by considering whether the file name has an extension that indicates whether the file should be searched for header information. For example, in one embodiment, files with file extensions .HTML, .HTY and .TXT are files that are to be searched. This prevents the present invention from searching irrelevant files, such as binary files. Also, the identification of the files to be searched may be included in a user-accessible file, providing the user with greater control.

Format identifier 224 of file system identifier 220 identifies the particular format indicators used in file system 165 to indicate index-organizing and descriptive elements. Any of a variety of known comparison, look-up, or other methods may also be used for carrying out this function. In an exemplary implementation in accordance with the network environment of FIG. 1, it will be assumed that file system 165 contains files (web pages) written in the HTML format. In such format, as noted above, an appropriate descriptive element is the title often placed in the header of each file by the file author. As will be described in greater detail below, one recognized HTML format for a title is the character string: "<!-- Title: title of the file-->" not including the quotation marks and in which the underlined words are the title. Block 224 would therefore identify such a format, and other recognized HTML formats for titles, as the formats used to indicate a title in file system 165. Similarly, an appropriate index-organizing element in a file written in the HTML format is the keyword or keywords that may similarly be placed in the header. Block 224 would therefore identify recognized HTML formats for keywords as the formats used to indicate keywords in file system 165. This information regarding recognized formats for titles and keywords, or other elements that are processed in accordance with continuous indexer 123 as described below, are then provided to file scanner 232 of index builder 230.

Index Builder 230. Index builder 230 includes file scanner 232; data structure generator 234, which generates storage, pointer, and search data structures 235, 236, and 237, respectively; and HTML-index generator 238, which generates HTML-index file 239 and HTML-search file 231. File scanner 232 accesses each file in the selected file system in accordance with known methods for addressing and retrieving files from local or remote file systems in accordance with the Hypertext Transfer Protocol. File scanner 232 thereby initiates processing of each such file, extracts header information from each file, and copies header information from remote files to a local file. In the present embodiment, such accessing is carried out sequentially, but it need not be so, and other known accessing methods appropriate to other data transfer protocols may be employed in other embodiments. Advantageously, as will be described below, a limited amount of information is typically read from each file so that the time required to access each file in the file system is commensurately limited. Hereafter, such process of accessing limited amounts of information from all files in the selected file system is referred to as scanning the file system. Also advantageously, file scanner 232 may periodically re-initiate a scan of the file system at a refresh rate selected by user 210. Data structure generator 234 places the extracted keyword, title, and location elements for each scanned file into the aforementioned associated data structures. Advantageously, data structure generator 234 creates linkages between such information derived from two or more scanned files having the same keyword, as described below, so that the descriptive elements are grouped together in HTML-index file 239 under their common keyword. Also advantageously, data structure generator 234 arranges and links such information in a manner that allows HTML-index generator 238 rapidly to build HTML-index file 239. HTML-index generator 238 builds HTML-index file 239 and formats such file in accordance with the HTML format.

Figure 3:
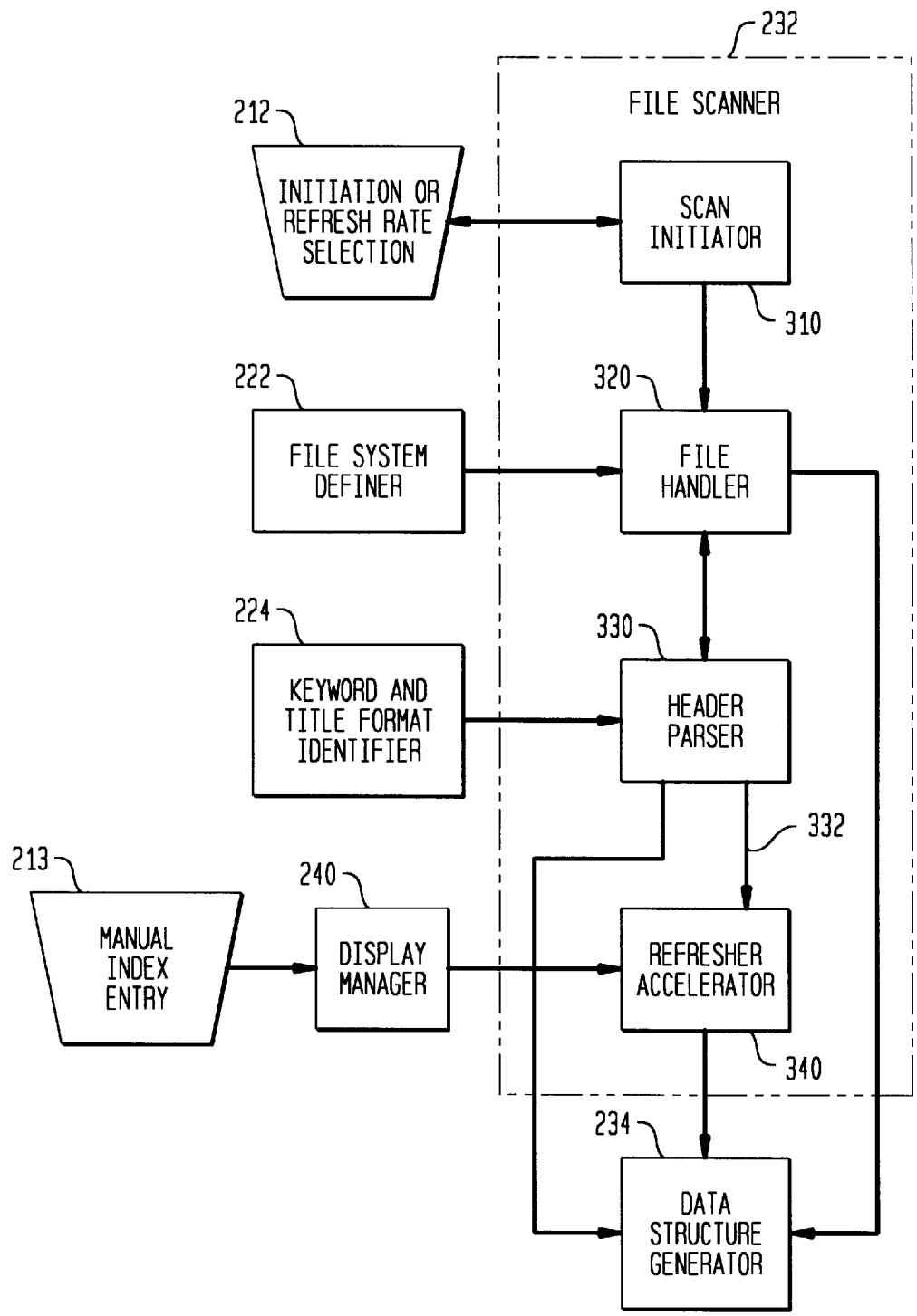
FIG. 3 is a functional block diagram of the file scanner of the index builder of the embodiment of FIG. 2.

FIG. 3 is a functional block diagram that illustrates the functions of file scanner 232 in greater detail. As shown in FIG. 3, scan initiator 310 of file scanner 232 prompts user 210 to provide an initiation or refresh rate selection 212. Any one of a variety of known graphical or other interfaces may be employed to effectuate such prompt and to receive the response. Typically, user 210 enters or indicates numbers representing when a current scan of file system 165 should be initiated and the time period after which subsequent scans should be conducted. For example, user 210 may indicate that a scan is to commence immediately, or after any specified period, such as one hour. Also user 210 may indicate that, after the current scan, subsequent scans are to take place every 24 hours, every week, or at any other designated interval or intervals. It will be understood that such time interval may vary depending on the rate at which information in the specified file system is expected to change, the importance of having the latest information, and other factors. In addition, scan initiator 310 may itself initiate a scan without having prompted user 210 as described above. For example, scan initiator 310 may automatically initiate a scan at off-peak hours or prior to a normal work day so that user 210 will have a current index available without initiating a new scan. Such scan may be conducted of the file system most recently selected, or most often used, by user 210. Alternatively, the scan may be of a default file system, or of a file system chosen according to other factors.

File handler 320 directs the process of sequentially examining each file in file system 165 whenever scan initiator 310 initiates a scan. File handler 320 accesses a first file from file system 165 in accordance with the functions of file system definer 222 and in accordance with known methods for accessing files using the Hyptertext Transfer Protocol. Other known accessing methods may be used in other embodiments. It will be understood by those skilled in the art that file system 165 may be organized by a hierarchical arrangement of directories and subdirectories, folders and subfolders, or other arrangement. In any such case, file handler 320 employs any of a variety of known methods to examine each file in each such directory, subdirectory, and so on. If there are no files in file system 165, or file system 165 cannot be accessed, file handler 320 terminates the operation of continuous indexer 123. Such termination is carried out in accordance with any of a variety of known methods for handling error conditions or other abnormal condition requiring premature termination of operations. Assuming that such abnormal condition does not exist, and that file handler 320 has successfully accessed a first file from file system 165 as stated above, such first file is then processed by header parser 330. File handler 320 also provides to data structure generator 234 the location of such first file as described below in relation to the operation of data structure generator 234. Such passing of information in this instance and in other instances as described with respect to this embodiment is accomplished according to any of a variety of known techniques. For example, the location information to be passed may be placed by file handler 320 in a portion of memory 122 where data structure generator 234 will expect to encounter it. Each file in file system 165 is passed by file handler 320 to header parser 330 in accordance with the operations described above until all such files have been so processed.

Header parser 330 opens and reads the first file accessed by file handler 320. Typically, header parser 330 will not read the entire file. Rather, header parser 330 will examine the contents of the file as they are received to determine if a header is present. A header is a collection of information about the file that is arranged in a standard, or generally recognizable, format, and is located near the top of the file. For example, in the HTML format, a standard form of a header may contain the name of the author of the file, the title of the file, and one or more keywords that describe the content of the file or are intended to help users find the file. In one such standard form, each header line will be preceded by the characters "<!--" and followed by the characters "-->" (not including the quotation marks in both instances). In accordance with this format, a typical header may consist of the following character string (end-of-line characters not shown; period added at end):
<!-- Author: author's name-->
<!-- Title: title of the document-->
<!-- Indexed By: (keyword1@(subkeyword1) (keyword2@subke word2)(. . .)-->.
The underlined words, supplied in this embodiment by the author of the file, are descriptive of content. Thus, in the "author" header line, author's name might be "John Doe." In the "title" header line, title of the document might be "Supply Order Form."

The "indexed by" header line typically contains a list of primary keywords, placed before the "@" symbol, and, optionally, secondary keywords, placed after such symbol. If only a primary keyword is used, the "@" symbol typically will not be used. Thus, the following line would indicate that the file is associated both with the primary keyword "Animals" and with the primary keyword "Elephant":
<!--Indexed By: (Animals) (Elephant)-->.
In contrast, the following header line would indicate that the file is associated with the secondary keyword "Elephant" as a category of animal under the primary keyword "Animals":
<!-- Indexed By: (Animals @ Elephant)-->.
As indicated by the ellipsis in the "indexed by" header line, numerous primary keywords, or pairs of primary and secondary keywords, may be included.

Alternatively, another known format generally accepted for HTML files places the header information in lines set off by the symbols "<" and ">" in the following manner (period added at end):
<META NAME="Author" CONTENT="author's name">
<META NAME="Description" CONTENT="title of document")
<META NAME="Keywords" CONTENT="(keyword1@ (subkeyword1) (. . . ).
The ellipsis again indicates the possibility of numerous primary keywords or pairs of primary and secondary keywords.

It will be understood that it is not material which of these formats, or another format, is used. It is only necessary in the illustrated embodiment that keyword and title format identifier 224 be able to identify the format so that header parser 330 may identify the keywords and titles of the files that it examines. It will further be understood that, in another embodiment, the files to be examined might not contain headers or might have keywords and titles located in portions other than the header. It is advantageous to group information such as is typically contained in a header near the top of a file so that the entire file does not have to be read completely in order to find such information. However, it will be understood that the present invention may be used in applications in which such prearrangement of information is not typical. Other embodiments of the invention may therefore employ other methods of deducing keywords and titles from the manner in which such information is formatted, the formatting of text more generally, or from other indicators.

Header parser 330 will terminate the reading of such first file if header information is not found in its anticipated location. Specifically, in accordance with one standard HTML format, it is typical for header information to be placed near the top of the file after certain tags such as <HTML> and <HEAD>, and before other tags such as <BODY> or <IMG>. Such rules of syntax may be associated, using known means such as a look-up table, with the type of formatting used in the files under examination. In the illustrated embodiment, keyword and title format identifier 224, having provided header parser 330 with formatting information appropriate to the HTML format used in file system 165, may thus also provide header parser 330 with corresponding syntax information regarding the placement of header information in an HTML-formatted file. Therefore, if header parser 330 encounters a post-header tag such as <BODY> before identifying a header, such condition is indicative of a lack of a header in the file being read. Header parser 330 will in such an instance cease reading the first file. Header parser 330 similarly will cease reading the first file if more than a pre-determined number of bytes, for example 10,000 bytes, are read before encountering a title and one or more keywords as identified by their formatting as described above. In either case, header parser 330 will return control to file handler 320 so that the next file is accessed and processed in the manner described above. Because only so much of a file is read as to enable the header information to be parsed, or to determine that a header is not present, the file typically will not be read in its entirety. Thus, a significantly larger number of files are read and header information extracted therefrom in a given period of time than if the entire file had been read. It will be understood that, in other embodiments, other criteria may be employed for terminating the reading of a file because header information is apparently not present. For example, header parser 330 may determine that the formatting or content of the file is consistent with that of an executable file rather than a text file, or is otherwise not in a format known to header parser 330 for processing by a look-up table or other technique. It will further be understood that, rather than seeking to extract title and keyword information, header parser 330 in another embodiment may seek to extract the name of the file, the name of the author of the file, or other information, whether or not found in the header. Alternatively, in other embodiments, the entire file may be read.

In the illustrated embodiment, refreshing of HTML-index file 239 may optionally be accelerated by refresher accelerator 340. User 210 may indicate whether or not to employ refresher accelerator 340 by being prompted to choose one or the other option by file system definer 222 in a known manner. User 210 may wish to employ refresher accelerator 340 because a remote file may require significant time to access and read, even if only the header of such file is read. Moreover, interruptions in service on the Internet or other network connecting host server 100 to file system 165 may also delay or prevent refreshing of HTML-index file 239 in accordance with the present invention. To minimize accessing and reading time, or to prevent such delays or impediments, refresher accelerator 340 copies the headers of remote files to a local file system connected by intranet or local area network to host server 100. Alternatively, the local file system may be located in memory 122. In other embodiments, entire files might be so copied, or the refresher accelerator 340 may be eliminated. The benefit of invoking refresher accelerator 340 is that refreshing of HTML-index file 239 will ordinarily not be delayed or prevented since all files in the selected file system will either originally be local files or their headers will have been copied to local files. User 210 may, however, wish not to employ refresher accelerator 340 because there is no assurance that the remote files represented by the copied local files continue to exist or exist with the same header information. Line 332 therefore represents the conditional passage of control from header parser 330 to refresher accelerator 340, contingent on an appropriate flag being set by file system definer 222 in accordance with the selection of such option by user 210 and in accordance with known methods for setting and responding to such flags or providing similar indications. If refresher accelerator has been invoked and has copied the header information of a remote first file to a local copy file, the address of such local file will also be passed from refresher accelerator 340 to data structure generator 234 in accordance with known techniques.

Figure 4A:
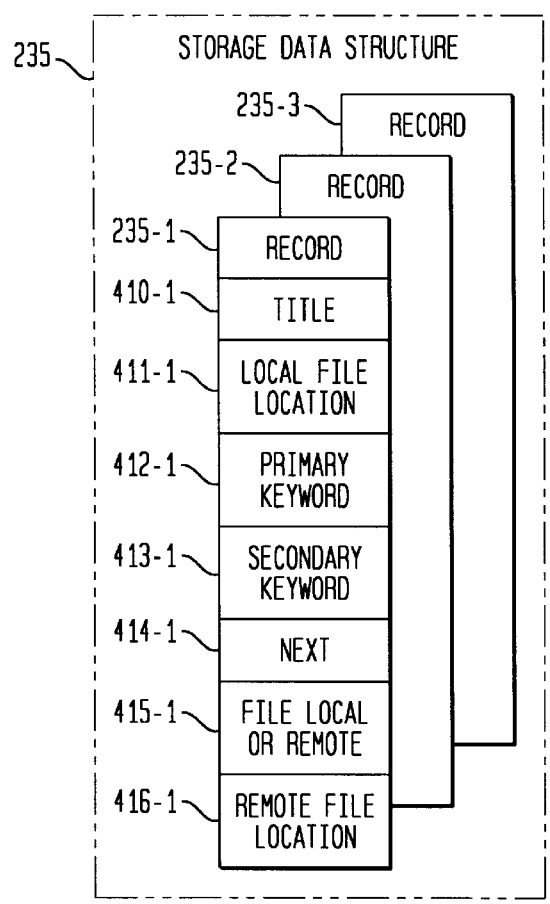
FIG. 4A is a symbolic representation of the storage data structure created by the data structure generator of the index builder of the embodiment of FIG. 2.
Figure 4B:
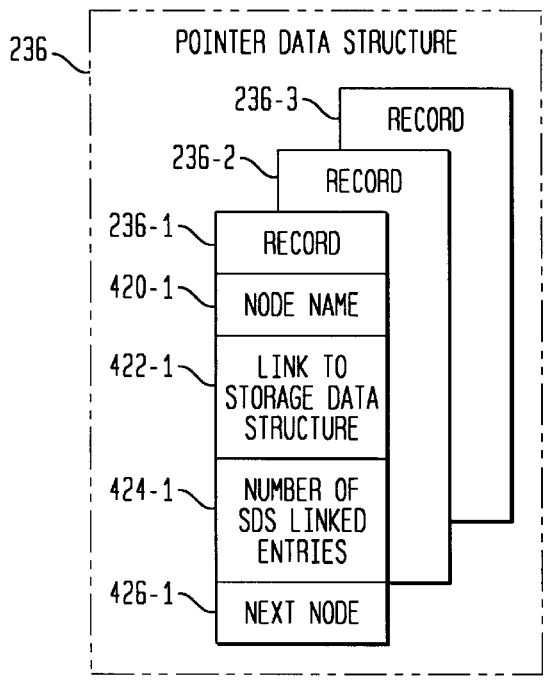
FIG. 4B is a symbolic representation of the pointer data structure created by the data structure generator of the index builder of the embodiment of FIG. 2.
Figure 4C:
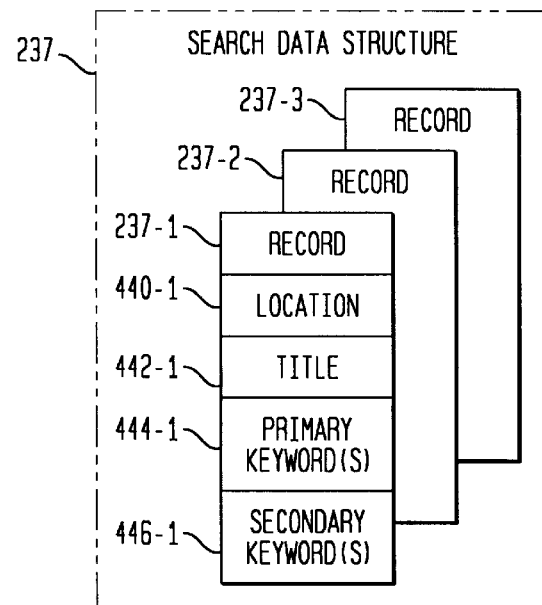
FIG. 4C is a symbolic representation of the search data structure created by the data structure generator of the index builder of the embodiment of FIG. 2.

Whether or not refresher accelerator 340 has been invoked, and assuming that header parser 330 has successfully found a header in the first file and identified the title and primary or secondary keywords of such file, control passes to data structure generator 234. As noted above, if such header information is not found for the first file, control returns to file handler 320 so that the next file in file system 165 is processed. Data structures 235, 236, and 237 operated upon by generator 234 are shown in FIGS. 4A, 4B, and 4C, with respect to the storage, pointer, and search data structures, respectively. Typically, these data structures will be located in memory 122 of host server 100. Records 1, 2, and 3 of data structure 235 are illustrated by the boxes labeled 235-1, 235-2, and 235-3, and records are similarly labeled for the other data structures. The fields within record 235-1 are labeled 410-1, 411-1, and so on, and are similarly labeled for the first records of the other data structures. The fields for the second and third records of the data structures are understood to be present but are not shown. It will also be understood that the illustration of three records is exemplary only, and that the number of records generally will be associated with the number of files in file system 165 and, as described below, the number of primary keywords contained in each such file.

Tables 1, 2, and 3 summarize the contents of storage data structure 235, pointer data structure 236, and search data structure 237, respectively. Specifically, tables 1, 2, and 3 summarize the information placed by generator 234 in the first records of the three indicated data structures corresponding to information regarding the first file of file system 165. The specific operations carried out by generator 234 in order to insert such information in the data structures will be described following the tables.

TABLE 1

Storage Data Structure 235

| Block of FIG. 4A | Field Name | Description |
|---|---|---|
| 410-1 | Title | The field represented by block 410-1 contains the title of the first file of file system 165 as extracted from the header of the first file by header parser 330. |
| 411-1 | Local File Location | If the first file is a local file, this field contains the location of such file, typically its file system path. Such location is provided by the file handler 320. If the first file is a remote file, this field contains the location of the local file, typically its file system path, into which the header of the remote file has been copied by a refresher accelerator 340. Such location is provided by refresher accelerator 340. |
| 412-1 | Primary Keyword | This field contains the primary keyword of the first file as extracted from the file's header by header parser 330. |
| 413-1 | Secondary Keyword | This field contains the secondary keyword associated with the primary keyword stored in field 412-1, if any, as extracted from the first file's header by header parser 330. |
| 414-1 | Next | This field contains a pointer to the next record, if any, in storage data structure 235 having the same primary keyword as contained in field 412-1. |
| 415-1 | File Local or Remote | This field contains a binary indicator indicating whether the first file is a local file or a remote file. |
| 416-1 | Remote Location | This field contains the original location, typically the URL, of the first file if it is a remote file. This location is provided by file handler 320. As noted above, if such remote file has been copied to a local file by refresher accelerator 340, the location of such copied local file will be placed in field 411-1. |

TABLE 2

Pointer Data Structure 236

| Block of FIG. 4B | Field Name | Description |
|---|---|---|
| 420-1 | Node Name | This field contains a primary keyword. |
| 422-1 | Link to Storage Data Structure | This field contains a pointer to the most recently processed record in storage data structure 235 containing the primary keyword entered in field 420-1. |
| 424-1 | Number of Linked Entries to Storage Data Structure | This field contains a counter that records the number of records in storage data structure 235 containing the primary keyword entered in field 420-1. |
| 426-1 | Next Node | This field contains a pointer to another record in pointer data structure 236, typically the next record in alphabetical order of the primary keywords in the node name 420 fields. |

TABLE 3

Search Data Structure 237

| Block of FIG. 4C | Field Name | Description |
|---|---|---|
| 440-1 | Location | This field contains the original location, typically the URL, of the first file, which will be its local file location if the first file is a local file, and will be its remote file location if the first file is a remote file. |
| 442-1 | Title | This field contains the title of the first file. |
| 444-1 | Primary Keyword(s) | This field contains the primary keyword or keywords in the header of the first file. |
| 446-1 | Secondary Keyword(s) | This field contains the secondary keyword or keywords, if any, in the header of the first file. |

As indicated in Table 1, generator 234 places the title, primary keyword, and secondary keyword, if any, extracted by header parser 330 from the first file, into fields 410-1, 412-1, and 413-1, respectively. If the header of the first file contains two or more primary keywords, any of which may also have an associated secondary keyword, a separate record in storage data structure 235 is created by generator 234 to accommodate each such primary keyword or primary-secondary keyword pair. That is, a file with multiple primary keywords will be treated as if it were multiple files.

Figure 5:
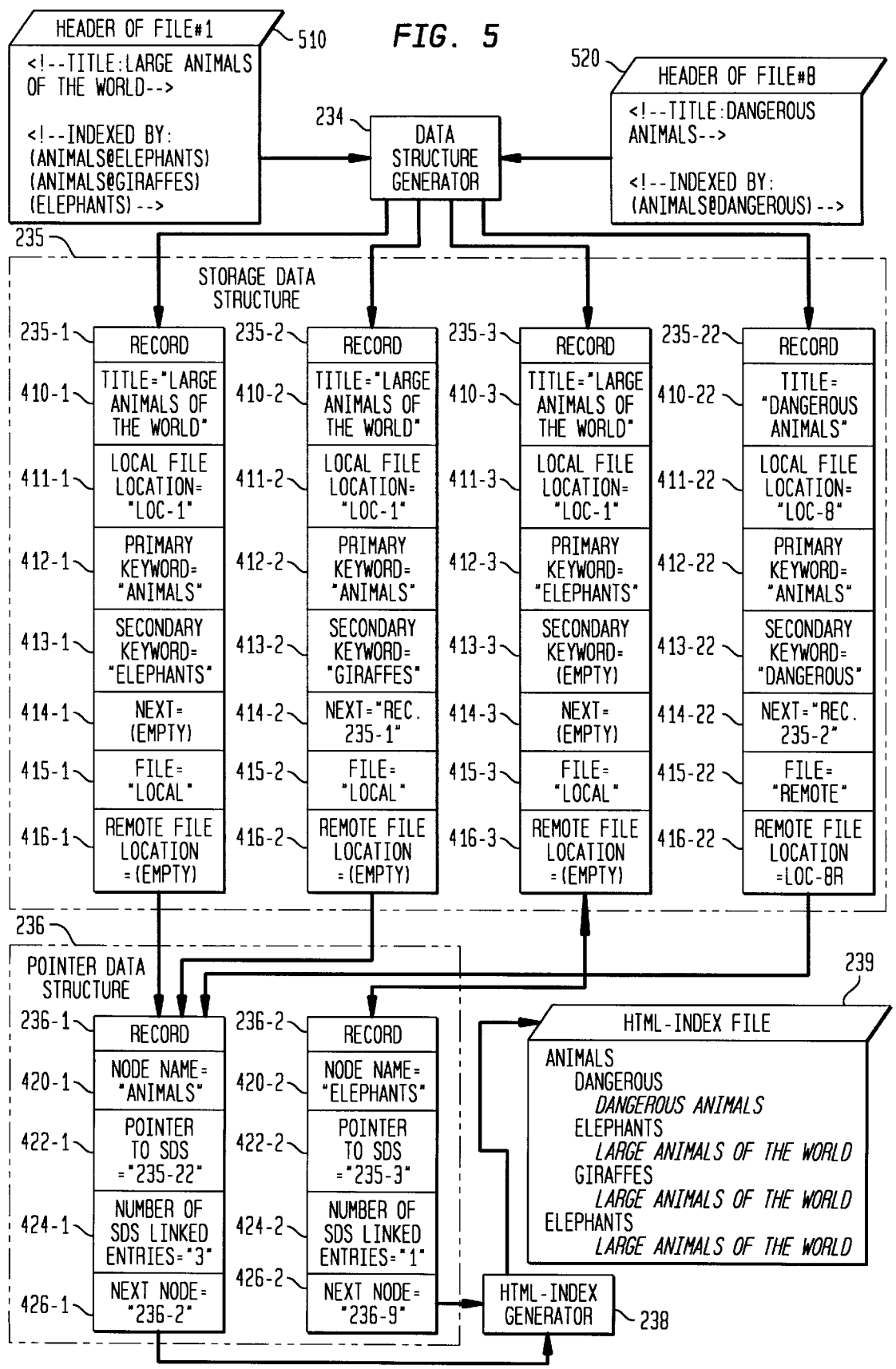
FIG. 5 is a data flow diagram showing the generation of data by the data structure generator into the storage data structure and pointer data structure of FIGS. 4A and 4B, respectively.

FIG. 5 illustrates such a situation of multiple primary and secondary keywords. Block 510 represents illustrative header information extracted from the first file of file system 165 by header parser 330. The title of the first file is seen to be "Large Animals of the World," and the primary keywords are "Animals" and "Elephants." Also, the primary keyword "Animals" has associated with it two secondary keywords, "Elephants" and "Giraffes." For illustrative purposes, HTML formatting characters have been preserved in block 510, although such characters typically would be deleted by header parser 330. This header information from the first file results in the creation by generator 234 of three records in storage data structure 235: record 235-1 for the primary-secondary keyword pair of "Animals—Elephants," record 235-2 for the primary-secondary keyword pair of "Animals—Giraffes," and record 235-3 for the primary keyword "Elephants." Block 520 represents the same process as applied to a subsequently processed file, arbitrarily assumed to be the eighth file in file system 165. The title of this file is seen to be "Dangerous Animals." Generator 234 creates record 235-22 (arbitrarily assuming that the intervening records of storage data structure 235 were filled by information relating to the second through seventh file of file system 165) to store header information from such eighth file. As indicated in block 520, such header information includes the primary keyword "Animals" paired with secondary keyword "Dangerous."

Generator 234 also inserts location information into storage data structure 235. With respect to the processing of the first file of file system 165, it is assumed for illustration that such file exists on a local file system. In such case, the binary indicator of fields 415-1, 415-2, and 415-3 are set to indicate the "local," as opposed to "remote," condition. Generator 234 inserts in the local file location fields 411-1, 411-2, and 411-3 the file system location of the first file, symbolically represented in FIG. 5 as "LOC-1." The remote file location fields 416-1, 416-2, and 416-3 remain empty as the first file has been assumed to be local rather than remote. It is assumed for illustration that the eighth file is located in a remote file system and that user 210 has chosen to invoke refresher accelerator 340 to copy the header information of such remote file to a local file, as described above. Thus, generator 234 sets the binary indicator in field 415-22 to indicate a "remote" condition, the location of the original remote file is entered into field 416-22, and the location of the copied local file is entered into field 411-22.

Generator 234 inserts pointers in storage data structure 235 and in pointer data structure 236 so that records in storage data structure 235 are associated with each other by their primary keywords and to provide links between one primary keyword and the next. The techniques used for this purpose are illustrated in FIG. 5 in reference to the processing of the first file of file system 165. As noted above, generator 234 creates a first record 235-1 in the storage data structure to store the title and the first primary-secondary keyword pair "Animals-Elephants." Generator 234, using any of a variety of known searching and comparing techniques, examines node name field 420 of the records of pointer data structure 236 to determine if a record exists with the same primary keyword "Animals." Because it is assumed for illustration that this is the first file and first primary keyword examined, there will be no such match with an existing node name. It will be understood that, in another embodiment, the meaning of a "match" may not be restricted to exact equivalents. For example, the two primary keywords "Animal" and "Animals" may be considered to be equivalent and the two forms may be normalized to a common form using known techniques.

Finding no match, generator 234 creates a new record, in this example record 236-1, and places the primary keyword "Animals" in the node name field 420-1. Generator 234 also increments by one the counter in field 424-1 to indicate that the number of entries in storage data structure 235 having the primary keyword entered in field 420-1 has increased by one. Generator 234 places in field 422-1 a pointer to the record in storage data structure 235 that is being processed; in this example, record 235-1 (not shown in FIG. 5 because the value in this field will subsequently be changed, as described below). When generator 234 undertakes the same operations with respect to record 235-2 of storage data structure 235, it also will encounter the primary keyword "Animals." It will be understood that it is immaterial whether such subsequent processing occurs before or after generator 234 has completed its processing of record 235-1 as described below, but such subsequent processing is described now for clarity. Finding that the primary keyword "Animals" already exists in the node name field of one of the records of the pointer data structure, specifically in field 420-1, generator 234 does not create a new record in such data structure. Rather, the counter in field 424-1 is incremented. The pointer in field 422-1, which, as noted above, contains a pointer to record 235-1, is moved to field 414 of the record in storage data structure 235 that is being processed, that is, field 414-2. Generator 234 inserts in field 422-1 of the pointer data structure a pointer to the record of the storage data structure that is being processed, record 235-2. When generator 234 undertakes the same operations with respect to record 235-22 of storage data structure 235, it also will encounter the primary keyword "Animals." In the same manner, generator 234 recognizes that the primary keyword in record 235-22 has previously been recorded in pointer data structure 236. Generator 234 therefore will update the counter, move the pointer in field 422-1 to the "next" field in record 235-22, and place a pointer to record 235-22 in field 422-1, as shown in FIG. 5.

When generator 234 processes record 235-3 of the storage data structure, it will note that the primary keyword of such record, "Elephants," does not occur in field 420 of any record of the pointer data structure. Therefore, generator 234 creates a new record 236-2 in the pointer data structure and places in field 420-2 the primary keyword "Elephants." The counter and pointer fields are updated as described above. Generator 234 processes in this manner each record of storage data structure 235 created as a result of the processing of the first and subsequent files in file system 165. As will be evident to those skilled in the art, the consequence of such processing will be that all of the occurrences of a primary keyword in storage data structure 235 are found by first consulting field 422 in the record of pointer data structure 236 containing such keyword in field 420, and then following the pointers linked to such field 422 through the "next" field 414 of records in storage data structure 235. Using any of a variety of known techniques for sorting data records, generator 234 alphabetizes such linked list of primary keywords. This sorting typically is done by rearranging the pointers in field 426 of the records of pointer data structure 236 to alphabetize according to primary keywords, and by rearranging the pointers in field 414 of the records of storage data structure 235 to alphabetize according to secondary keywords grouped together with a common primary keyword. This is referred to as an "insertion sort". As one skilled in the relevant art would find apparent, any sort algorithm may be used. The sorting also typically is done while the files in file system 165 are being processed by data generator 234 in the manner described above, although alphabetizing may also take place after the files have been processed. In the illustrated embodiment, file handler 320 determines, according to known means for accessing and reading remote or local files, that all files in file system 165 have been processed and passes control to data structure generator 234 for the purpose of such alphabetizing. The number of storage data structure linked entries 424 is used to efficiently determine the number of linked entries.

Figure 6:
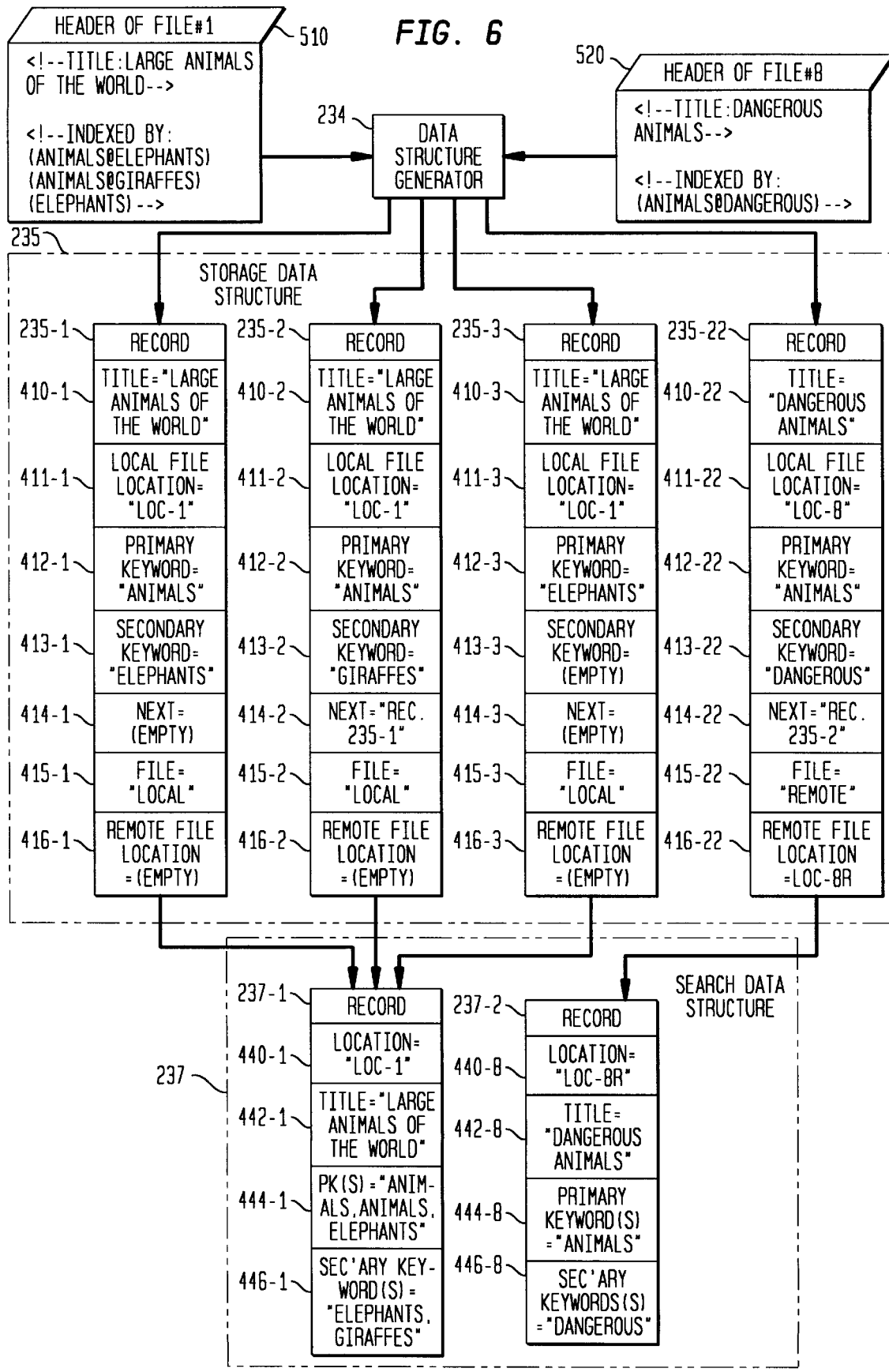
FIG. 6 is a data flow diagram showing the generation of data by the data structure generator into the search data structure of FIGS. 4C.

Generator 234 also creates entries in search data structure 237. Search data structure 237 allows user 210 quickly to determine whether HTML-index file 239 contains header information from a file in file system 165 that matches a character string chosen by user 210. For example, user 210 may wish to know whether the word "Elephants" is found in the title, primary keyword, or secondary keyword of any such file. For this purpose, generator 234 creates record 237-1 in search data structure 237 for the first file in file system 165. The location of the first file is stored in field 440-1, the title is stored in field 442-1, the primary keyword or keywords are stored in field 444-1, and the secondary keyword or keywords, if any, are stored in field 446-1. Similar records are created for all other files in file system 165 as they are processed by generator 234. This process is illustrated in FIG. 6 for the illustrative example of the processing of the same first file and the same eighth file as described in FIG. 5. That is, in FIG. 6, generator 234 has created records 235-1, 235-2, 235-3, and 235-22 in accordance with the process described above. FIG. 6 therefore shows record 237-1 created by generator 234 as it processes the first file and record 237-8 as it processes the eighth file. It will be understood that other records, corresponding to the second through seventh file processed by generator 234 also exist in search data structure 237, but are not shown. It will also be understood that, in other embodiments, duplicate entries, such as the word "animals" in field 444-1, may be reduced to one occurrence. Duplicate entries may also be preserved, however, to assist in weighing search results. That is, a search for the word "animals" may be more strongly associated with record 237-1, where the word is found three times, than with record 237-8, where the word is found two times. The weighted search results may be conveyed to user 210 by the use of any of a variety of known display formats or techniques. It will further be understood that many known methods may be used to prevent the entry of common words, such as "the" or "of" in field 442-1, by generator 234 into the records in search data structure 237. Also, in another embodiment, any of a variety of known search and comparison methods may be used to allow matches of character stings that are similar to, but not the same as, each other.

In addition to processing header information from files of file system 165, generator 234 may also process comparable information provided directly by user 210. As described in greater detail below in relation to FIG. 12, user 210 may supply a title, primary or secondary keywords, and a location for any file of interest whether or not included in file system 165. Such an operation is functionally represented by manual index entry 213 of FIG. 2. To ensure that such manually entered information is preserved for subsequent operations of continuous indexer 123 without the need to reenter the information, such manually entered header information is provided by display manager 240 to refresher accelerator 340. Refresher accelerator 340 then operates upon such manually entered header information in the same manner as accelerator 340 operates upon the header information of remote files. Specifically, manually entered header information is copied to a local file that is thenceforth considered to be part of file system 165. Generator 234 may then create records in storage data structure 235, pointer data structure 236, and search data structure 237 for such manually entered header information in the same manner as if such information had been contained in a file of file system 165.

Having concluded the process described above for all files in file system 165, control passes from data structure generator 234 to HTML-index generator 238. In any of a variety of known methods for constructing files in the HTML format, generator 238 creates HTML-index file 239 using the information in storage data structure 235 and pointer data structure 236. For example, in reference to the illustrative representation of FIG. 5, generator 238 typically begins construction of file 239 by referring to the first record in pointer data structure 236, record 236-1. The first primary keyword, as stored in field 420-1 of such record, is entered as a primary index heading in file 239. Following pointer 422-1 to record 235-22 of storage data structure 235, the secondary keyword, title and location of the file of file system 165, the header information of which is stored in record 235-22, is entered in HTML-index file 239. Advantageously, the location entered will be the remote file location stored in field 416-22 will be entered in HTML-index file 239 so that user 210 may access the original file, as described below in relation to FIGS. 9 and 10. If record 235-22 had been associated with a file that was originally a local file, the location information entered into HTML-index file 239 would have been the local file location stored in field 411 of the records of storage data structure 235.

As will be evident to those skilled in the art, HTML-index file 239 is completed by following the pointers in fields 422 and 426 of pointer data structure 236 and field 414 of storage data structure 235. In one of many possible arrangements, generator 238 thereby groups secondary keywords alphabetically under their primary keywords, which themselves are arranged alphabetically. Titles of the files of file system 165 are typically arranged to correspond with each secondary keyword or, if a primary keyword has no secondary keyword, with such primary keyword. For clarity, such arrangement is shown in HTML-index file 239 of FIG. 5 without HTML formatting characters. Also not shown is the file location information that, as described above, is associated in HTML-index file 239 with each occurrence of each title.

Figure 12:
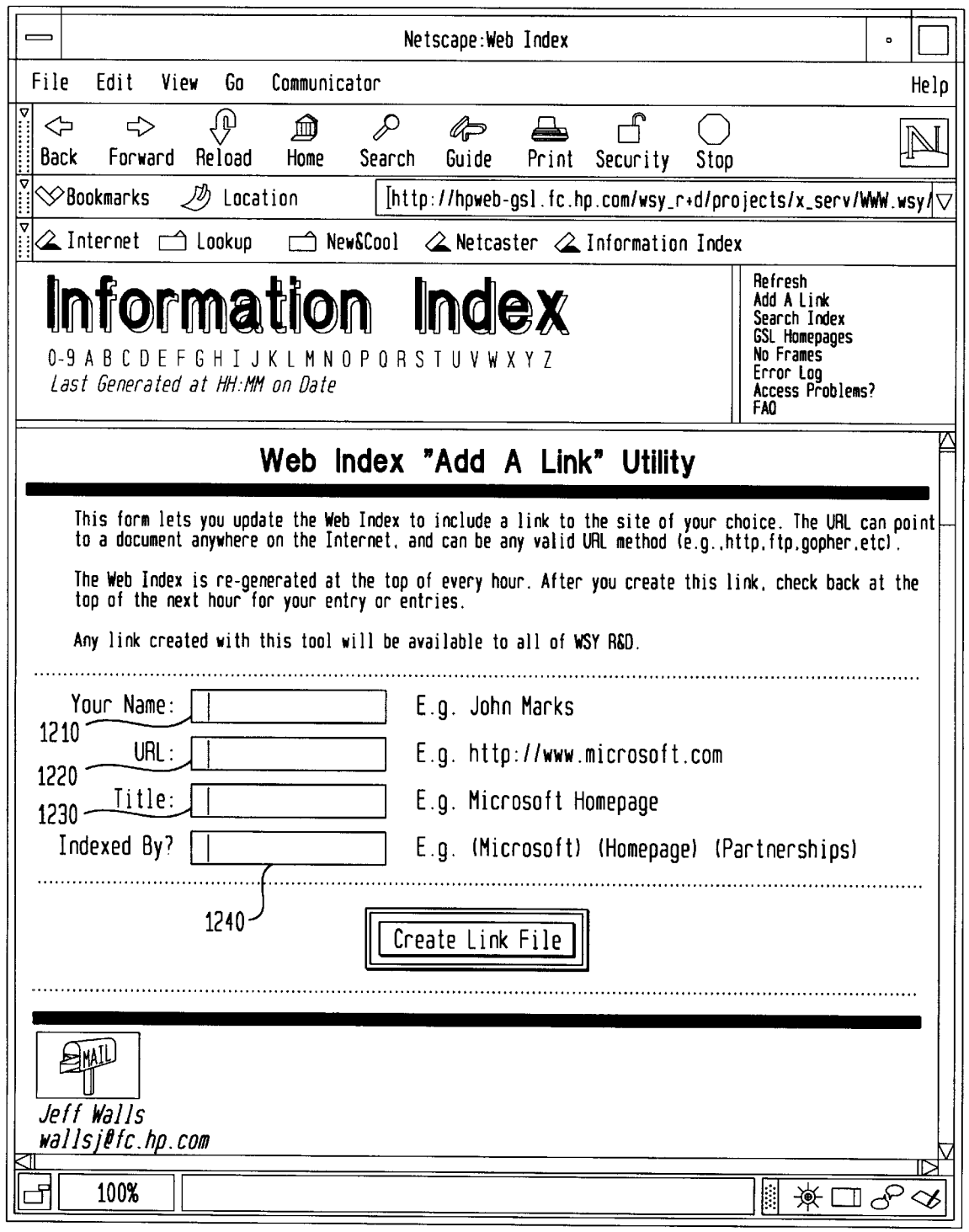
FIG. 12 is a graphical illustration of an add-entry form in accordance with the embodiment of FIG. 2.

Display Manager 240. Using known techniques for displaying files in HTML format, display manager 240 allows user 210 to initiate requests to display specified portions of HTML-index file 239 (hereafter, simply "index 239") on the display unit of user computer 175. Also using such known techniques, display manager 240 allows user 210 to request a search for a character string in index 239. In response to such requests, display manager 240 displays the requested portions of index 239, or displays a search report. FIGS. 7 through 11 are graphical representations of the results of such operations by display manager 240. FIG. 12 is a graphical representation of a form that is displayed by display manager 240 to allow user 210 manually to enter header information into index 239.

Figure 7:
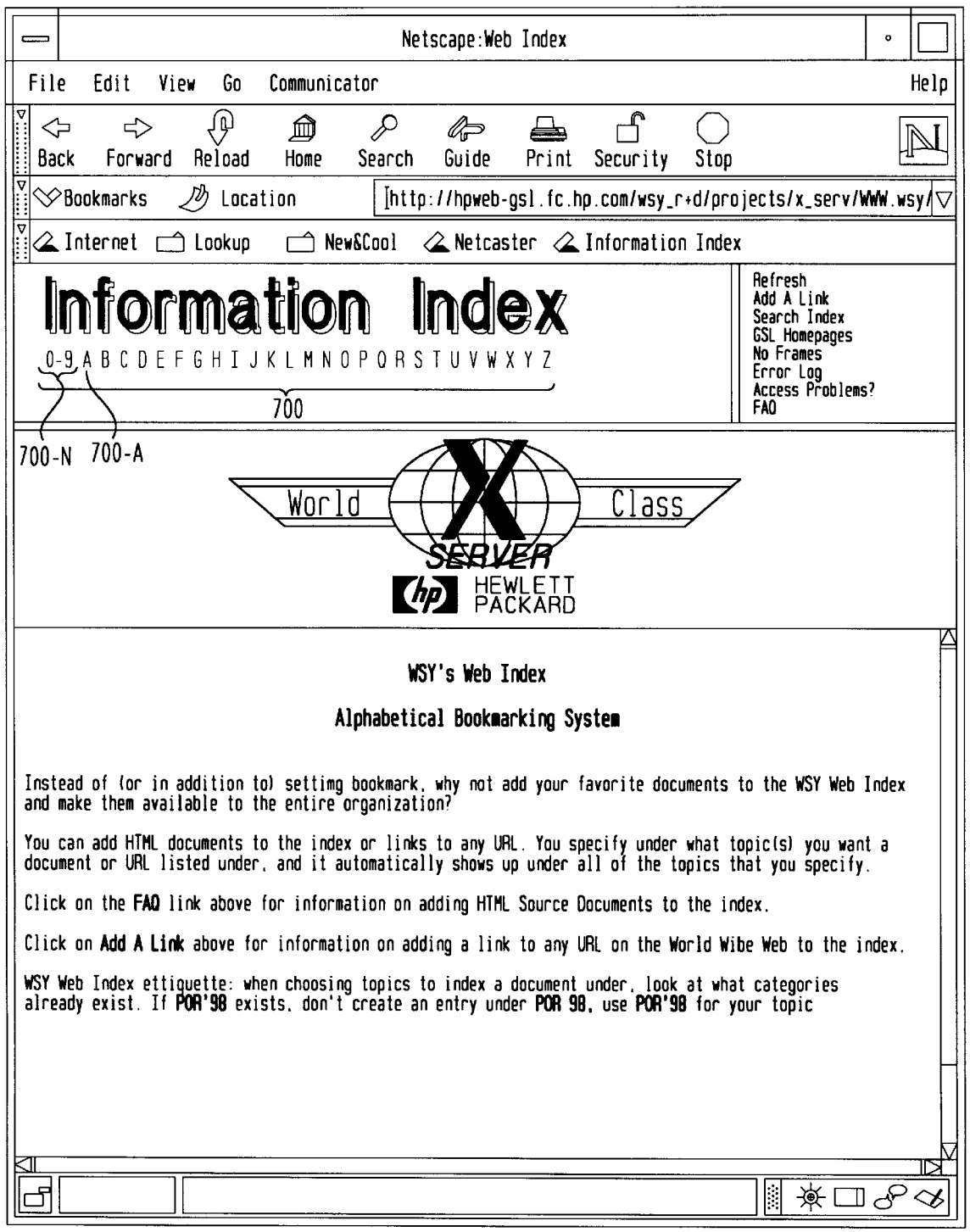
FIG. 7 is a graphical illustration of a main page display and initial index-jumping interface in accordance with the embodiment of FIG. 2.
Figure 8:
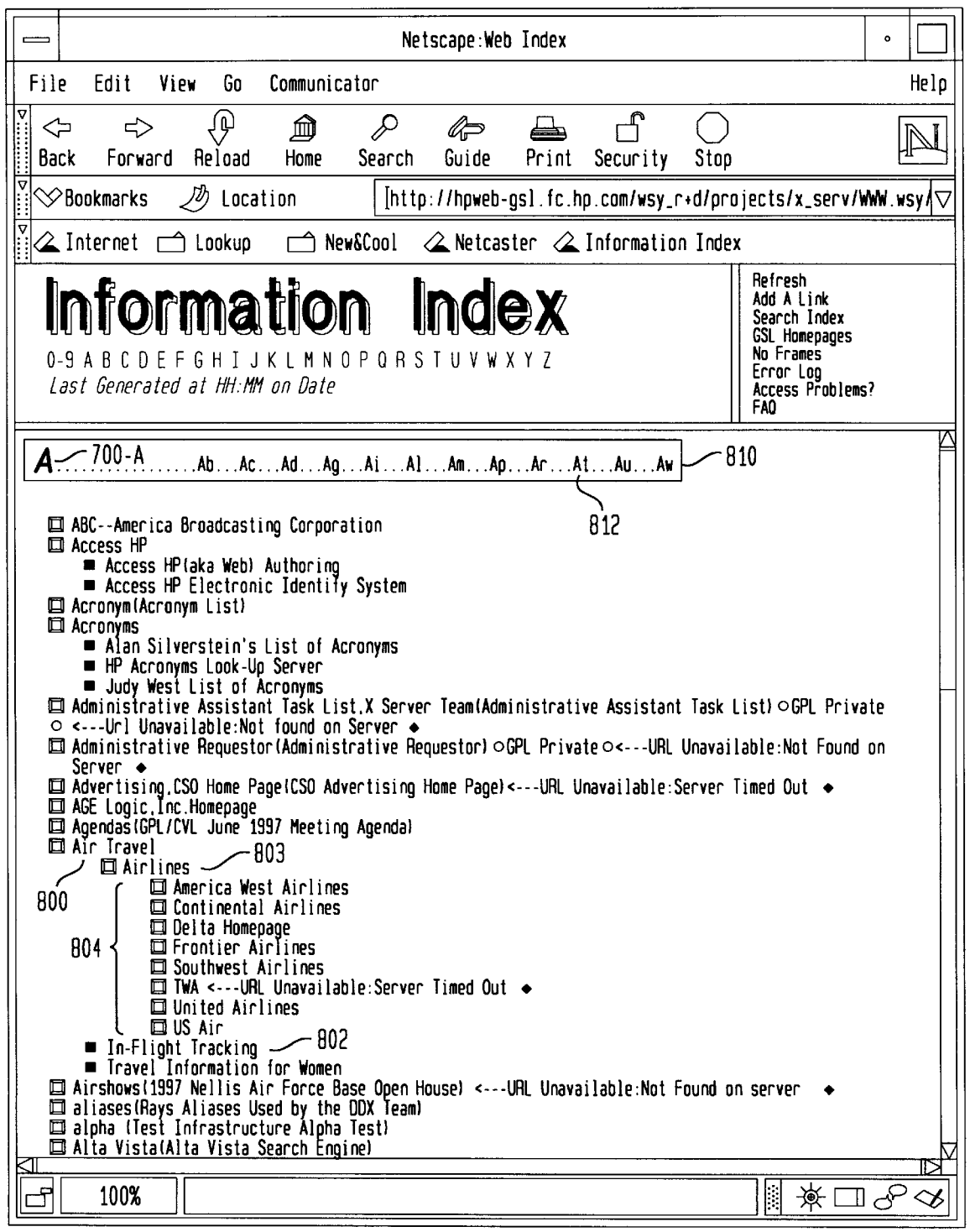
FIG. 8 is a graphical illustration of an index display and secondary index-jumping interface in accordance with the embodiment of FIG. 2.
Figure 9:
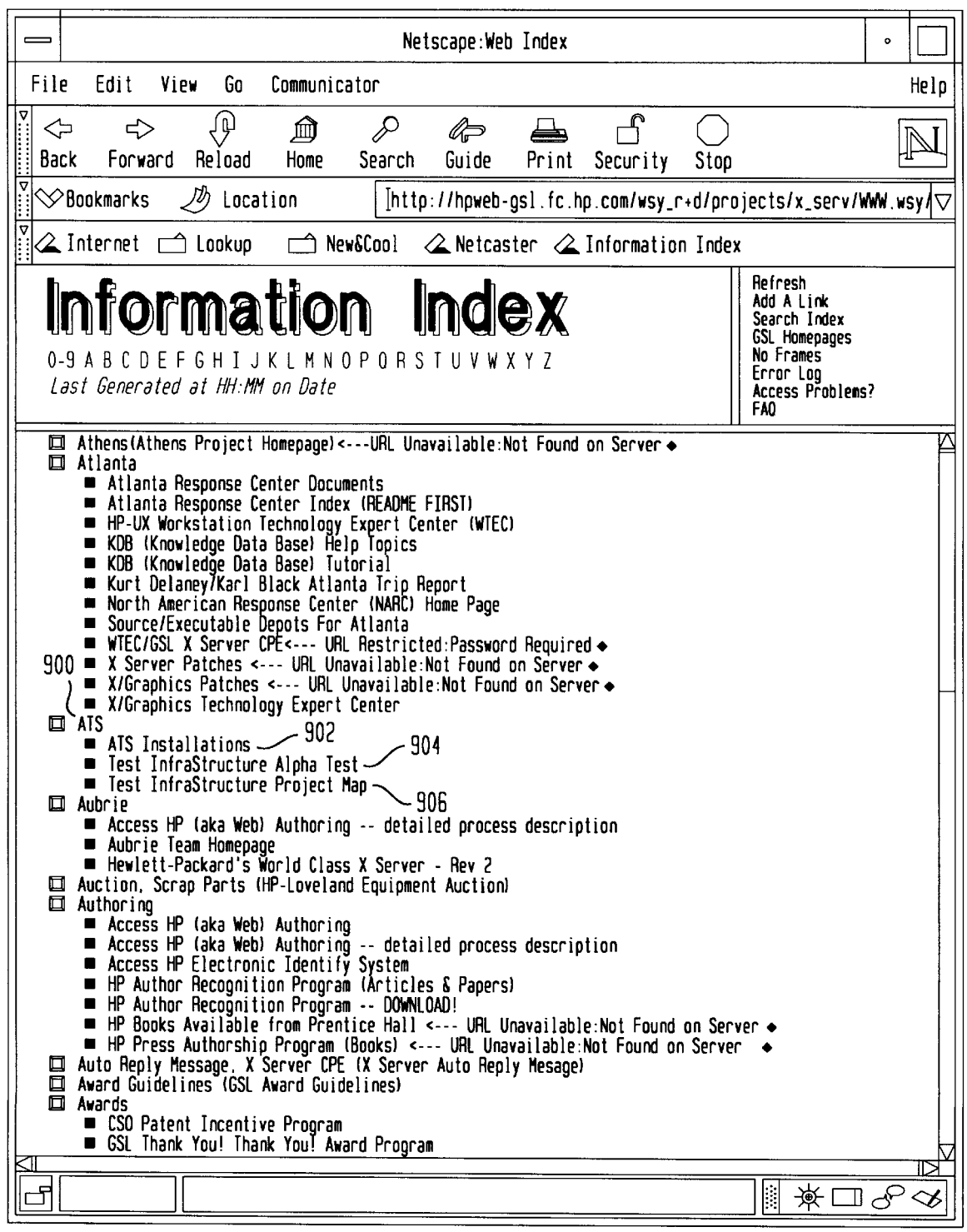
FIG. 9 is a graphical illustration of an index display at a location specified by use of the secondary index-jumping interface of FIG. 8 in accordance with the embodiment of FIG. 2.

The representations of FIGS. 7 through 12 are generated according to known methods for displaying HTML-formatted files using the Netscape® web browser. It will be understood, however, that such displays could be generated by a variety of other techniques well known to those skilled in the art. It will further be understood that those graphical elements shown on FIGS. 7 through 12 that are not identified by reference numbers are not material to the invention, and that the style of presentation, such as type face or color, of graphical elements generally is not material to the invention unless otherwise noted below. In particular, it will be understood that the format for displaying portions of index 239, as are represented in FIGS. 8 and 9, may differ in numerous ways from the form of indentation and spacing shown in those figures. For example, bullets, numbering, coloring, varying font styles, and so on, may be used to highlight the placement of titles with respect to the keyword or secondary keyword with which they are associated, to set off secondary keywords from primary keywords, and so on.

FIG. 7 is a graphical illustration of an initial display in accordance with this embodiment. Such initial display is accessed by user 210 in a known manner by entering into the Netscape® web browser a URL that represents the location of index 239 on host server 100. Graphical element 700, hereafter referred to as the "main character bar," consists in this embodiment of 27 sub-elements consisting of the 26 letters of the Roman alphabet, such as sub-element 700-A for the letter "A," and a sub-element 700-N representing the integers 0 through 9. It is understood that, in other embodiments, the alphabet may be of any language, including machine languages or codes, and that many other groupings or selections of letters, numbers, or characters are possible. In the illustrated embodiment, the 26 alphabetical sub-elements, such as 700-A, represent the first letters of primary keywords in index 239, and sub-element 700-N represents primary keywords beginning with an integer. In a known manner, such as by moving a cursor-locating device such as a mouse or manipulating a track ball, user 210 may direct the cursor on the display unit of user computer 175 into proximity with one of such 27 sub-elements of main character bar 700. User 210 may then select such sub-element, corresponding to the first letter, or digit, of a primary keyword of interest, by a known method such as clicking the mouse or trackball. For example, if user 210 is interested in files of file system 165 that are indexed in index 239 by the keyword "Animals," user 210 would select the letter "A" from the main character bar by clicking on or near graphical element 700-A. It will be understood that other techniques for selecting a portion of index 239 are possible.

Each of the sub-elements of main character bar 700 is identified with a particular location in index 239. Such identification is accomplished in accordance with known methods for linking graphical elements of displayed HTML files to locations of, or within, the same or other HTML files. For example, sub-element 700-A is linked to the location within index 239 in which keywords beginning with the letter "A" have been placed by HTML-index generator 238. Thus, if user 210 selects, for example, sub-element 700-A, a signal is generated from user computer 175 through Internet or intranet 150, to host server 100, indicating that user 210 wishes to view index 239 at the location where keywords beginning with "A" are found. In accordance with known procedures and techniques for responding to such signals, host server 100 causes the requested portion of index 239 to be transmitted to user computer 175, where it is displayed on the display unit.

FIG. 8 is a graphical illustration of such a display of index 239 at the start of the portion of index 239 where primary keywords beginning with the letter "A" are located. For example, graphical element 800 represents the primary keyword "Air Travel." Grouped alphabetically under such keyword are the titles of files in file system 165 that have such keyword in their headers. For example, graphical element 802 represents the title "In-Flight Tracking" of a file having "Air Travel" as a primary keyword. A secondary keyword "Airlines" is associated with the primary keyword "Air Travel." In the illustrative embodiment this secondary keyword is listed immediately under, and indented from, the primary keyword, and is shown by graphical element 803. Titles associated with the primary and secondary keywords are listed immediately under, and indented from, the secondary keyword, as indicated by graphical elements 804. It is understood that this placement and format is illustrative only, and that many other graphical formats for presenting index 239 organized by primary keywords, or by secondary keywords, and for displaying the associated titles, are possible in accordance with the present invention.

User 210 may further specify a desired location in index 239. Graphical element 810, hereafter referred to as the "secondary character bar," consists in the present illustrative example of sub-element 700-A of the main character bar and character pairs such as character pair 812 consisting of the letters "At." Such character pairs are made up of the single character chosen from the main character bar, in this example the letter "A," and one additional letter of the alphabet. However, display manager 240 advantageously causes a character pair to be included in secondary character bar 810 only if there exists in index 239 at least one primary keyword beginning with such character pair. For example, the character pair "Ai" is included in secondary character bar 810 because index 239 contains at least one primary keyword beginning with the letters "Ai." Conversely, because there are no primary keywords beginning with the letters "Aj," this character pair advantageously is not so included. In the manner described above with respect to the selection of a sub-element of main character bar 700, user 210 may select a sub-element of secondary character bar 810, such as character pair 812. Such selection indicates that user 210 wishes to access index 239 at the location where primary keywords beginning with the letters "At" are located.

The result of such a selection, and of the display of the selected portion of index 239 in the manner described above, is shown in FIG. 9. FIG. 9 and FIG. 8 are equivalent graphical representations of index 239 except at different locations within such index. The selection process described above in reference to main character bar 700 and secondary character bar 810 therefore allows user 210 to move easily and rapidly among displays of different portions of index 239. It will be understood that, alternatively, user 210 may scroll through index 239 from any location represented in FIGS. 8 or 9 to another location within index 239 in accordance with known methods and techniques.

For illustrative purposes, it is assumed that user 210 selects the character pair "At" from secondary character bar 810 because user 210 is interested in accessing files in file system 165 relating to the keyword "ATS." As indicated by graphical element 900 in FIG. 9, such keyword is seen to be included in index 239. Three files of file system 165, represented by titles 902, 904, and 906, contain the primary keyword "ATS," as indicated by their grouping under keyword 900. User 210 may then select one of such titles in the manner described above in order to retrieve the file from file system 165 having such title. For example, user 210 may select graphical element 902 in order to access a file having the title "ATS Installations," which is then displayed on user computer 175 in accordance with known procedures and techniques for accessing and displaying files in HTML format using the Hyperlink Transfer Protocol. Specifically, as noted above, HTML-index generator 238 includes with each title in index 239 the URL or location of the file in file system 165 having such title. In accordance with known processes and techniques, the selection by user 210 of a title, such as represented by graphical element 902, causes a signal to be sent by user computer 175 over Internet or intranet 150 to access the file that is located at the URL that is associated in index 239 with the selected title. Thus, the accessing by user 210 of the file having the title "ATS Installations" may typically take place without the involvement of host server 100, unless file system 165 is located in memory 122 of host server 100. If, contrary to the example just described, the keyword "ATS" had not been displayed in its appropriate alphabetical location among keywords beginning with the character pair "At," user 210 would thereby immediately be apprised of the fact that no file in file system 165 contained this keyword.

Figure 10:
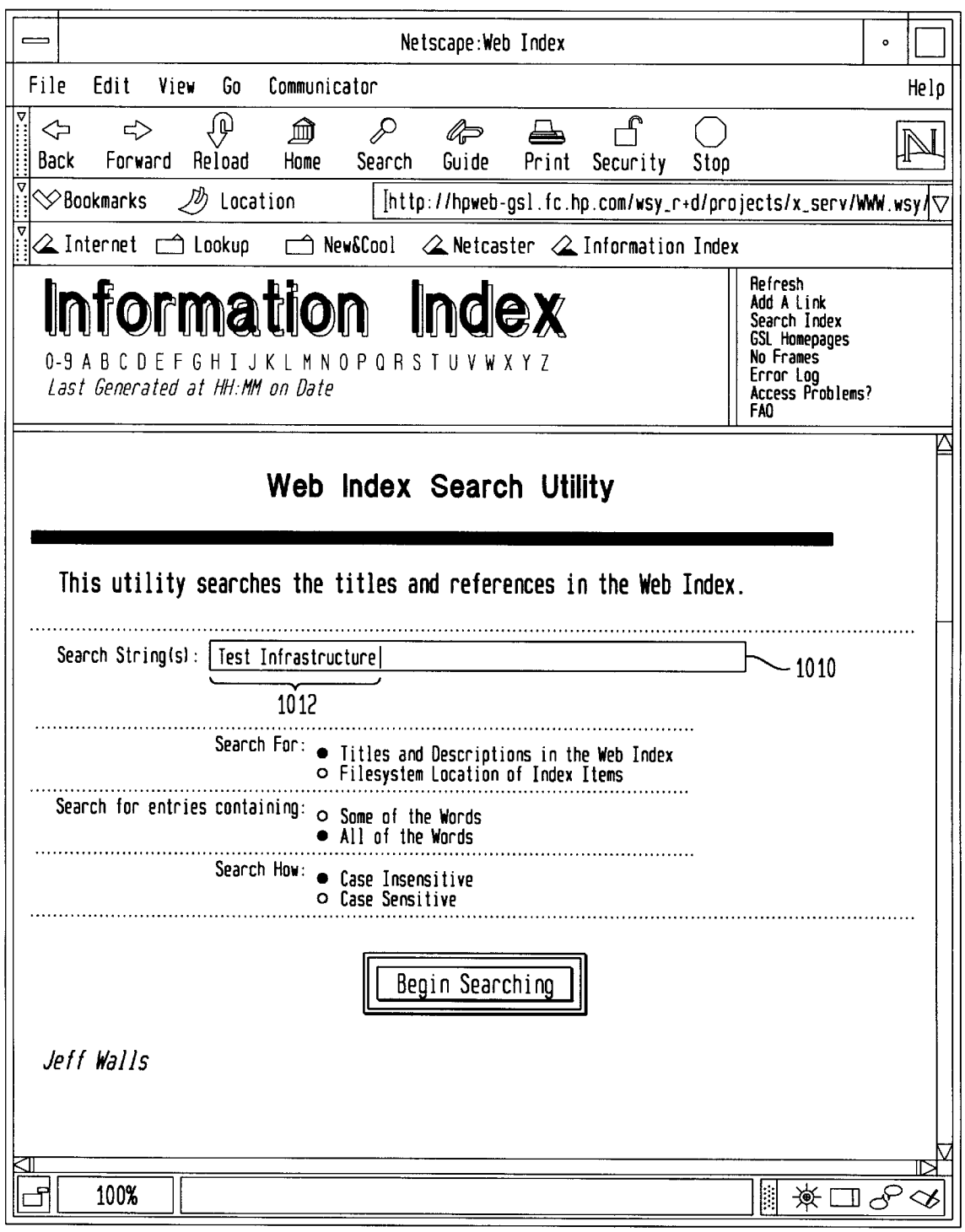
FIG. 10 is a graphical illustration of a search request form in accordance with the embodiment of FIG. 2.
Figure 11:
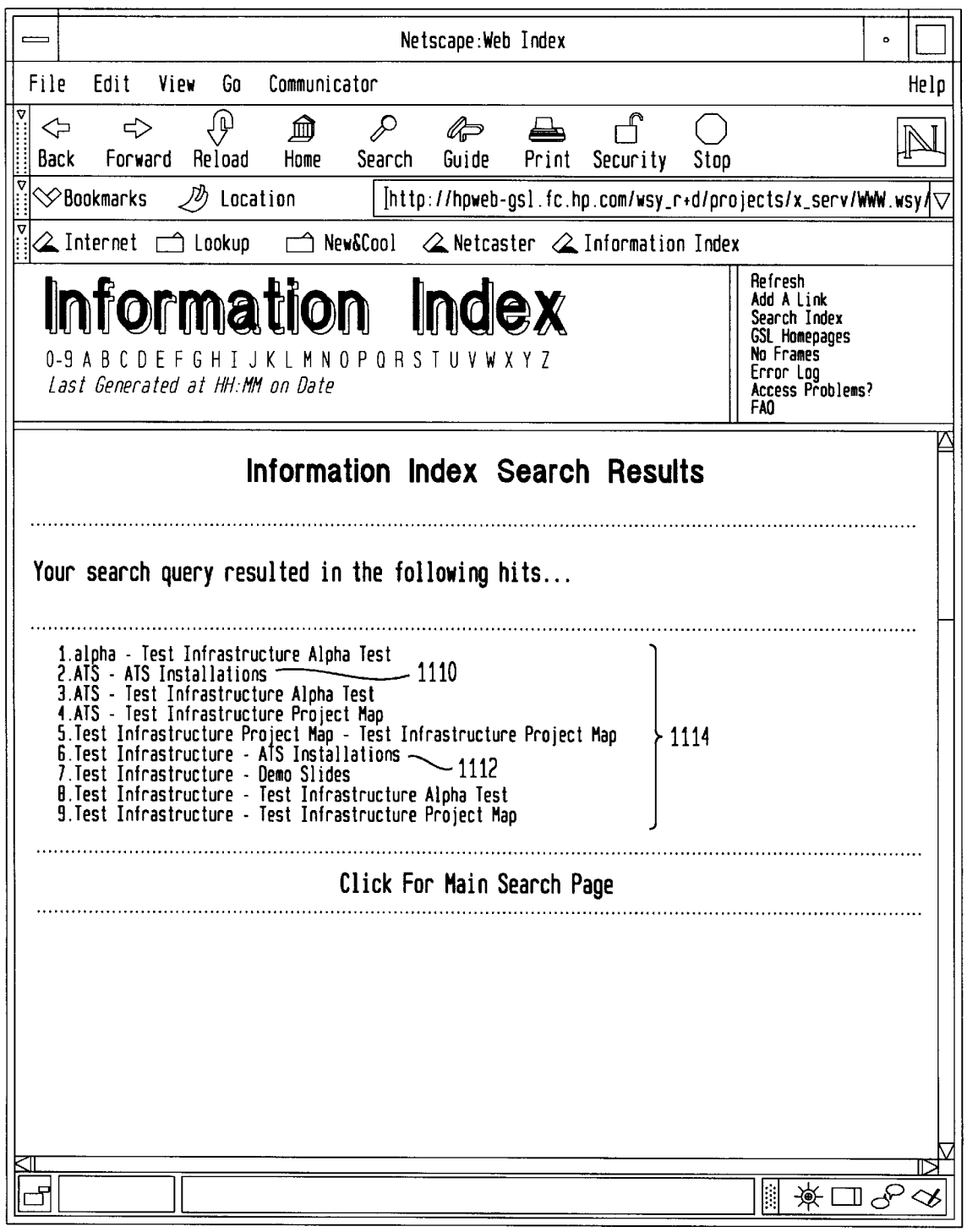
FIG. 11 is a graphical illustration of a search request report form in accordance with the embodiment of FIG. 2.

FIG. 10 is a graphical representation of a search request form created by display manager 240 in response to a search specification 214 by user 210. Graphical element 1010 is a text input bar into which user 210 enters a string of characters 1012 that user 210 wishes to search for in index 239. In the illustrative example of FIG. 10, such search request string is "Test Infrastructure." Display manager receives this search string in a known manner and passes control to HTML-index generator 238 to generate an HTML-search file 231 for the current search. Generator 238 employs any of a variety of known search and compare techniques to search through each record of search data structure 237 to find a record that contains both the search words "test" and "infrastructure." For each record in which such a match is found, generator 238 creates an entry in HTML-search file 231, such as the entry shown as graphical element 1110 of the search report display represented in FIG. 11. In this embodiment, the entry consists of the primary keyword and the title of the file corresponding to the matched record in search data structure 237. If such file contains more than one primary keyword, then additional entries are created in HTML-search file 231 for each such primary keyword, as shown by graphical element 1112. As will be evident to those skilled in the relevant art, many other methods may be employed in other embodiments to determine whether there is a match. For example, if more than one word is entered by user 210 in the search string, a match with either of such words may be considered a match for purposes of creating an entry in HTML-search file 231. Having completed its search of search data structure 237, generator 238 advantageously orders all entries in HTML-search file 231 alphabetically. Generator 238 provides HTML-search file 231 to display manager 240 for display to user 210. The graphical elements labeled 1114 illustrate the resulting search report. It will be understood that location information, not shown, is included in HTML-search file 231 for each file corresponding to each entry in search report 1114. User 210 may then select an entry, for example by selecting graphical element 1110. In a known manner, the file in file system 165 corresponding to such entry will then be displayed on user computer 175.

FIG. 12 is a graphical illustration of an add-entry form created by display manager 240 in response to a manual index entry 213 by user 210. As described above, such entry is processed by refresher accelerator 340 to create a file that is processed by data structure generator 234 in the same manner as files in file system 165 are processed. Graphical elements 1210, 1220, 1230, and 1240 are text input boxes into which user 210 enters the user's name, the URL of the file that user 210 wishes to include in index 239, the title that user 210 wishes to associate with such file, and the primary or secondary keywords that user 210 wishes to associate with such file, respectively. The user's name is not used in this embodiment, but may be used in other embodiments. For example, the user's name, and the name of the author of files in file system 165, may be used as the index-organizing element in place of, or in addition to, the primary and secondary keywords of such files.

Having now described one embodiment of the invention, it should be apparent to those skilled in the relevant art that the foregoing is illustrative only and not limiting, having been presented by way of example only. The system and method described above are intended to be applicable to commercial systems such as might be used for identifying, organizing, and accessing HTML-formatted files of interest on the Internet or on an intranet. The present invention is also applicable to identifying, organizing, and accessing information in non-HTML formats found on the Internet or in other distributed or non-distributed databases. For example, the invention is suitable for indexing documents that may be retrieved in accordance with the "File Transfer Protocol (FTP)," or "Gopher" protocol. Documents retrieved in accordance with these protocols are also uniquely identified by their URL, but other means of identifying the location of a document may be used. As further example, the invention may advantageously be used to organize and retrieve documents or other information units from any database by identifying for each such unit a location in the database so that it may be retrieved; a descriptive element, whether a title or other description, so that user 210 may have an indication of the scope and content of the information unit; and an index-organizing element, which need not be a keyword but might be the name of the author of the information unit, the date on which it was written, or some other organizing feature. Such information, whether in HTML or another format, may be contained in a non-distributed database, i.e., where the data is maintained in a relatively small number of memory units accessible to the data processing system or method of the invention either directly or over a communication line or network. Thus, although the term "file" has been used with respect to the illustrative embodiment of the invention for organization and retrieval of HTML-formatted documents over the Internet or an intranet, it will be understood that the invention is not so restricted. Numerous other embodiments and modifications thereof are contemplated as falling within the scope of the present invention as defined by appended claims and equivalents thereto.

What is claimed is:

1. A continuous indexer configured to search one or more files within at least one file system at one or more intervals to provide a user with a continuously updated index of information contained within said at least one file system, said index comprising:

a plurality of index-organizing elements characterizing subjects of said information; and a plurality of corresponding location elements each identifying which of said one or more files contains said subject characterized by said corresponding index-organizing element.

2. The continuous indexer of claim 1, wherein said index further comprises:

a plurality of descriptive elements each corresponding with one of said index-organizing and corresponding location elements, each said descriptive element describing said subject of said information characterized by said index-organizing element.

3. The continuous indexer of claim 1, wherein said index further comprises:

one or more secondary index-organizing elements each corresponding with one of said index-organizing elements, each said secondary index-organizing element characterizing said information in greater specificity than characterized by said corresponding index-organizing element.

4. The continuous indexer of claim 1, wherein said at least one file system is user-selected.

5. The continuous indexer of claim 1, wherein said at least one file system comprises files in a network.

6. The continuous indexer of claim 1, wherein said at least one file system comprises files in a distributed database.

7. The continuous indexer of claim 1, wherein said one or more files is in HTML format.

8. The continuous indexer of claim 1, wherein at least one of said one or more files is user-selected.

9. The continuous indexer of claim 1, wherein said continuous indexer searches a predetermined portion of said one or more files.

10. The continuous indexer of claim 9, wherein at least one of said one or more files comprises a header and text, and said predetermined portion of said at least one of said one or more files comprises said header.

11. The continuous indexer of claim 2, wherein said plurality of descriptive elements are titles of said one or more files.

12. The continuous indexer of claim 1, wherein said one or more intervals is user selected.

13. The continuous indexer of claim 1, wherein said one or more intervals is a predetermined interval.

14. The continuous indexer of claim 1, wherein at least one of said one or more files comprises a header and text, said header comprises one of said plurality of index-organizing elements, and said index-organizing element comprises a keyword.

15. The continuous indexer of claim 2, wherein said continuous indexer comprises:

a file-system identifier configured to identify said at least one file system from which said index is created, and further configured to analyze said one or more files of said at least one file system to determine how said index-organizing and descriptive elements are to be extracted from said one or more files.

16. The continuous indexer of claim 2, wherein said continuous indexer comprises:

an index builder configured to extract from at least one of said one or more files said index-organizing element and said descriptive element, and configured to organize said elements and said location element in a predetermined format.

17. The continuous indexer of claim 16, wherein said predetermined format is alphabetical.

18. The continuous indexer of claim 16, wherein said index builder comprises:

a file scanner configured to access said at least one of said one or more files;

a data structure generator configured to generate at least one data structure and to store said index-organizing element, said descriptive element, and said location element in said at least one data structure; and an index generator configured to generate said index from said stored elements.

19. The continuous indexer of claim 18, wherein said index generator formats said stored elements in an HTML format to generate said index.

20. The continuous indexer of claim 18, wherein said file scanner is configured periodically to re-initiate processing of said at least one of said one or more files at a user-selected refresh rate.

21. The continuous indexer of claim 18, wherein said file scanner is configured periodically to re-initiate processing of said at least one of said one or more files automatically without a user command.

22. The continuous indexer of claim 18, wherein said at least one of said one or more files is a remote file and said file scanner is configured to copy said header information from said remote file to a local file within said at least one file system.

23. The continuous indexer of claim 18, wherein said at least one data structure comprises:

a storage data structure to store said index-organizing element, said descriptive element, and said location element; and a pointer data structure linked to said storage data structure to link a first pair of said stored descriptive element and corresponding said stored location element to a second pair of said stored descriptive element and corresponding said stored location element, said corresponding index-organizing element of said first pair being linguistically similar to said corresponding index-organizing element of said second pair.

24. The continuous indexer of claim 23, wherein said linguistic similarity is that said index-organizing element of said first pair is the same as said corresponding index-organizing element of said second pair.

25. The continuous indexer of claim 23, wherein said at least one data structure further comprises a search data structure in which to store said index-organizing element and said location element, and wherein said stored search elements are configured to be compared to at least one user-specified character.

26. The continuous indexer of claim 25, wherein said index generator is configured to format said stored search elements in an HTML format to generate a search report in response to said user-specified search character.

27. The continuous indexer of claim 18, wherein said file scanner comprises:

a scan initiator configured to initiate processing of said at least one of said one or more files;

a file handler configured to access said at least one of said one or more files in response to said scan initiator; and a header parser configured to extract said index-organizing element from said at least one of said one or more files.

28. The continuous indexer of claim 27, wherein said header parser is configured to terminate access to said at least one of said one or more files if the formatting scheme of said file is not the same formatting scheme as at least one formatting scheme in a predetermined database of formatting schemes.

29. The continuous indexer of claim 27, wherein said header parser is configured to terminate access to said at least one of said one or more files if a post-header HTML tag is found before said index-organizing element is found.

30. The continuous indexer of claim 27, wherein said header parser is configured to terminate access to said at least one of said one or more files if more than a predetermined number of bytes of data are encountered before said index-organizing element is found.

31. The continuous indexer of claim 2, wherein said continuous indexer further comprises a display manager configured to display specific portions of said index in response to user-generated commands.

32. The continuous indexer of claim 31, wherein said displayed specific portions of said index comprise at least one descriptive element displayed in association with a corresponding index-organizing element.

33. The continuous indexer of claim 3, wherein said continuous indexer further comprises:

a display manager configured to display specific portions of said index in response to user-generated commands, said displayed specific portions of said index comprising a plurality of index-organizing elements, at least one secondary index-organizing element displayed in association with a corresponding index-organizing element, and at least one descriptive element displayed in association with a corresponding secondary index-organizing element.

34. A method for displaying a portion of an index on a graphical user interface, said index including a plurality of index-organizing elements, each having an initial character and a set of first two initial characters, said index further including corresponding location elements, said method comprising the steps of:

(a) displaying a character bar comprising a plurality of said initial characters;

(b) moving a cursor on the graphical user interface to a position proximate to a desired initial character;

(c) selecting said desired initial character; and (d) displaying said portion of said index in which said index-organizing elements have said initial characters.

35. The method of claim 34, further comprising the steps of:

(e) displaying a character bar comprising a plurality of said set of first two initial characters, each having said selected desired initial character;

(f) moving a cursor on the graphical user interface to a position proximate to a desired said set of first two initial characters;

(g) selecting said desired set of first two initial characters; and (h) displaying said portion of said index in which said index-organizing elements have said desired set of first two initial characters.

36. A method for retrieving a file from a file system having one or more files each containing information, comprising the steps of:

(a) displaying an index on a graphical user interface, said index including a plurality of index-organizing elements characterizing subjects of said information, a plurality of corresponding location elements each identifying which of said one or more files contains said subject represented by said corresponding index-organizing element, and a plurality of descriptive elements each corresponding with one of said index-organizing and location elements, each said descriptive element describing said subject of said information characterized by said index-organizing element;

(b) moving a cursor on the graphical user interface to a position proximate to a first descriptive element describing information of interest;

(c) selecting said first descriptive element; and (d) retrieving said file identified by said location element.

37. The method of claim 36, further comprising the step of:

(e) displaying said information in said file associated with said selected descriptive element.

38. A method for displaying a continuously updated index of information contained within at least one file system having one or more files, each of said files having an index-organizing element, descriptive element, and a location element, said method comprising the steps of:

(a) identifying said file system;

(b) extracting from said one or more files said associated index-organizing, descriptive, and location elements;

(c) organizing said index-organizing elements;

(d) associating each of said location elements with its said associated index-organizing element; and (e) displaying each of said descriptive elements with its said associated said index-organizing elements.

* * * * *